W. P. MILLS & C. M. BAGSHAW.
PULLING-OVER AND LIKE MACHINE.
APPLICATION FILED FEB. 12, 1915.

1,293,162.

Patented Feb. 4, 1919.
14 SHEETS—SHEET 1.

W. P. MILLS & C. M. BAGSHAW.
PULLING-OVER AND LIKE MACHINE.
APPLICATION FILED FEB. 12, 1915.

1,293,162.

Patented Feb. 4, 1919.
14 SHEETS—SHEET 6.

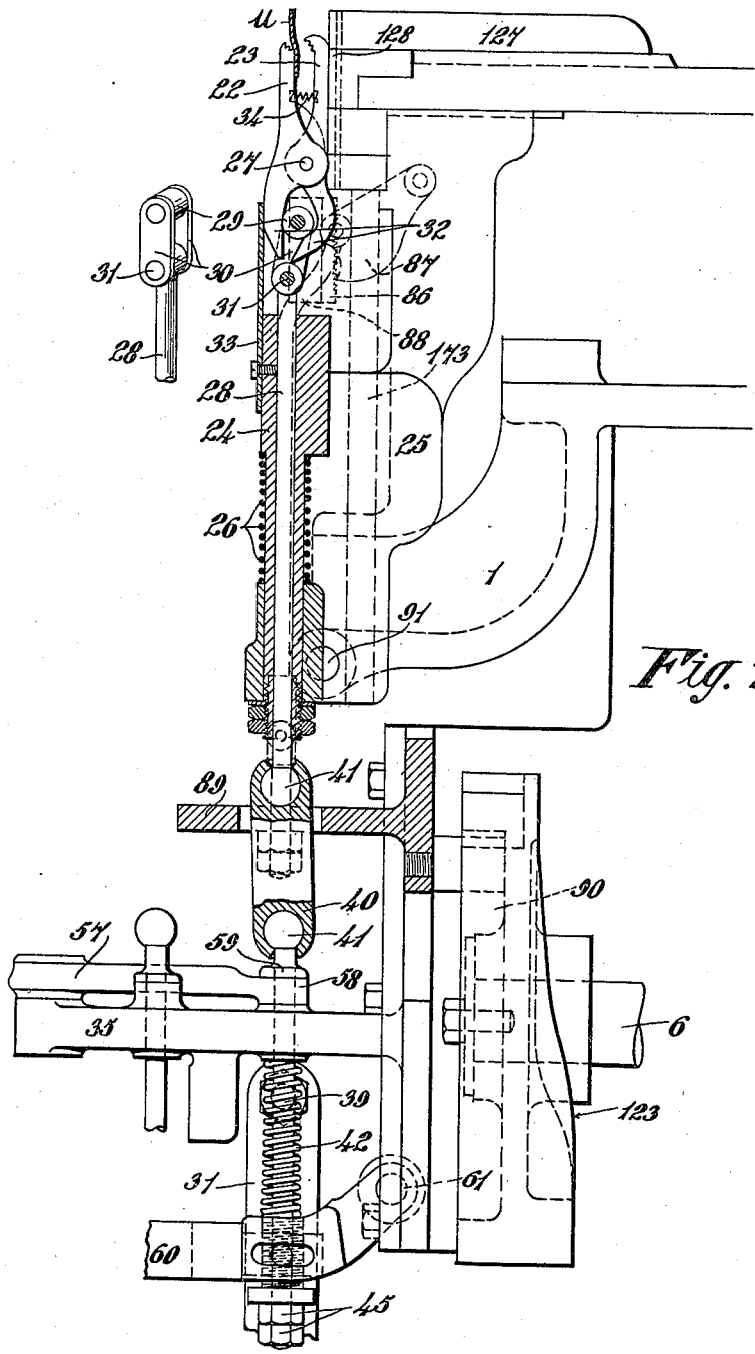

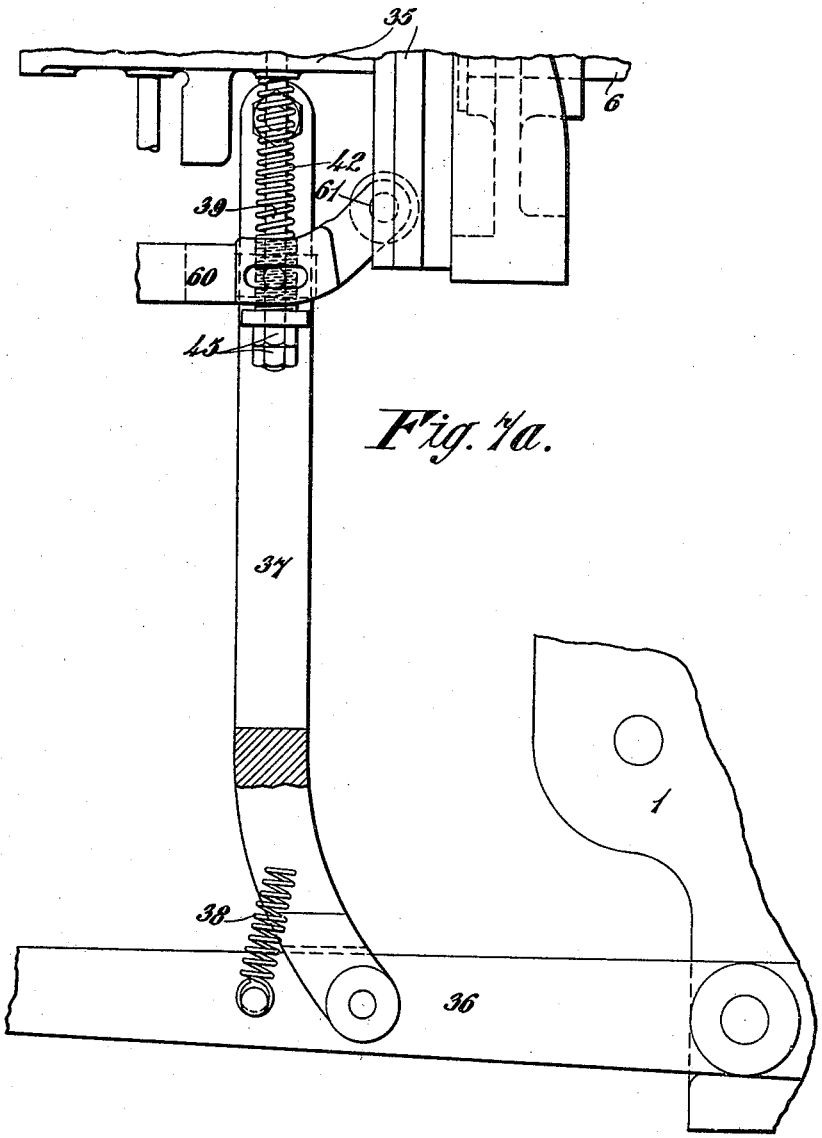

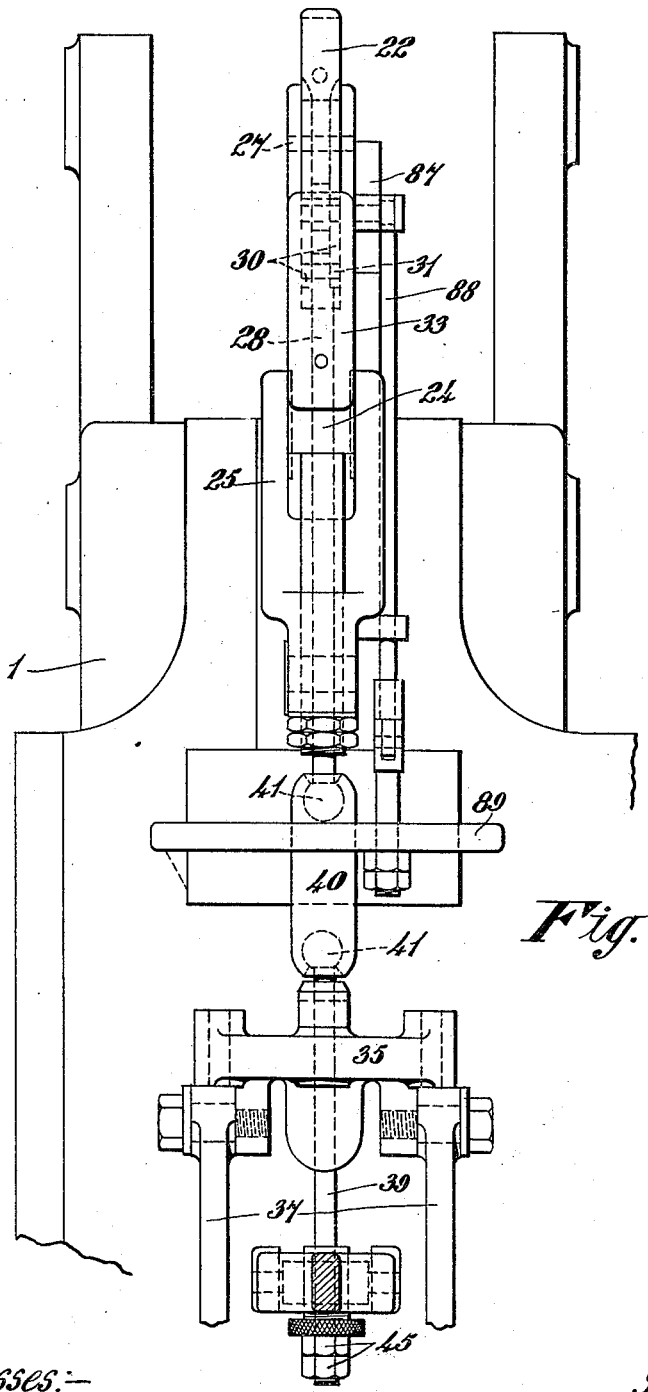

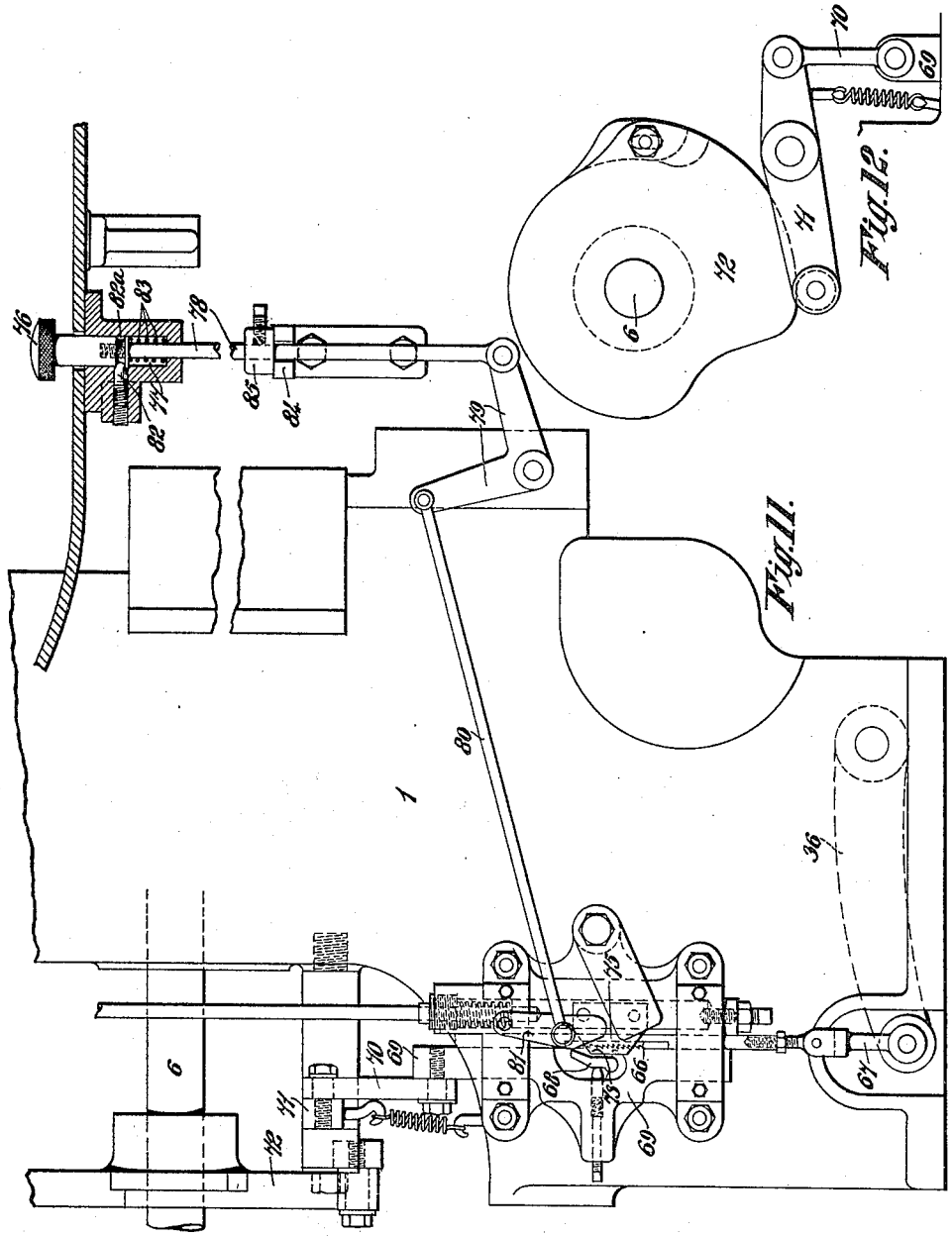

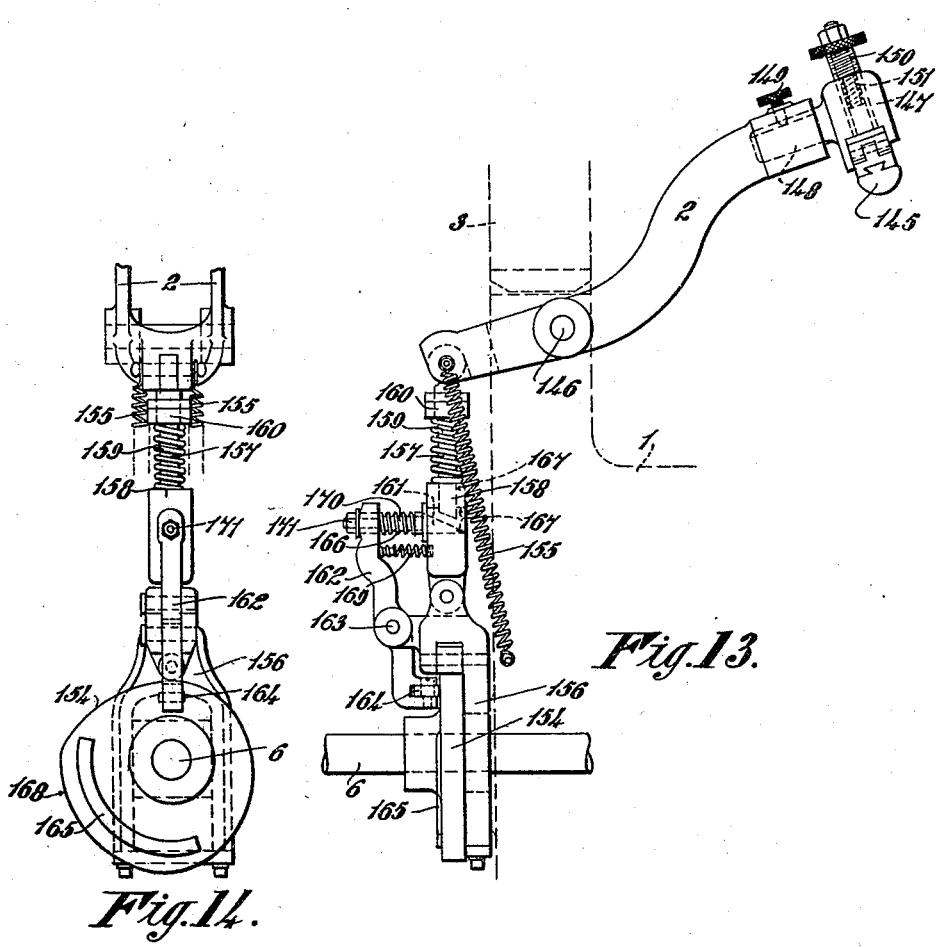

W. P. MILLS & C. M. BAGSHAW.
PULLING-OVER AND LIKE MACHINE.
APPLICATION FILED FEB. 12, 1915.

1,293,162.

Patented Feb. 4, 1919.
14 SHEETS—SHEET 14.

Witnesses:-
John C. Anders
Albert F. Heuman

Inventors:-
William Philip Mills
Charles Martin Bagshaw

UNITED STATES PATENT OFFICE.

WILLIAM PHILIP MILLS AND CHARLES MARTIN BAGSHAW, OF LEICESTER, ENGLAND, ASSIGNORS TO GIMSON & CO. (LEICESTER) LIMITED, OF LEICESTER, ENGLAND, A CORPORATION OF GREAT BRITAIN.

PULLING-OVER AND LIKE MACHINE.

1,293,162.      Specification of Letters Patent.      Patented Feb. 4, 1919.

Application filed February 12, 1915. Serial No. 7,664.

*To all whom it may concern:*

Be it known that we, WILLIAM PHILIP MILLS and CHARLES MARTIN BAGSHAW, both subjects of the King of Great Britain, both citizens of Leicester, England, and both residing at Leicester, in the county of Leicester, England, have invented new and useful Improvements in or Relating to Pulling-Over and like Machines, of which the following is a specification.

This invention has reference to machines, employed in the manufacture of boots and shoes, for performing pulling-over and similar operations.

The present invention relates to and includes a power driven pulling-over machine of generally improved construction and arrangement particular features of the invention being the means for straining the upper over and around the last and the actuating and controlling mechanisms thereof.

In mechanically pulling over the upper of a boot or shoe two principal operations are involved viz. the stretching of the upper over the last to properly set it thereon and cause it to conform to the surface thereof, and the turning or wiping in and subsequent securing of the edge of the strained upper around the edge of the last.

The invention has reference to pulling-over machines of the type wherein the last is supported bottom downward in an approximately horizontal position, and upper gripping pincer mechanisms—employed for drawing the upper around the last—are operable primarily by the operator and subsequently by power driven mechanism.

In one machine of the above mentioned type, the stretching operation has been performed partly by the operator and partly by power driven means, the upper being partly stretched over a stationary last by the operator and the stretching operation subsequently completed mechanically by forcing the last into the held upper by power driven means. In another machine of the same type, the whole of the stretching operation has been performed by the operator by forcing the last into the upper while the pincer mechanisms gripping the edge of the upper have remained stationary, the subsequent actuation of the power driven means—started at will—turning or wiping in the edge of the strained upper.

The present invention comprises a pulling-over machine of the above mentioned type characterized by the fact that in combination with the feature that the last is non-movable during the whole operation of the machine, the stretching of the upper over the last is effected entirely by an operation of the pincers performed by the operator, the power driven mechanism being subsequently put into operation at will to wipe in the stretched upper under the last.

In the improved machine the important feature is that the straining or stretching of the upper over the last is effected entirely by the operator without any movement of the last taking place.

It is also within the ambit of this invention to provide, in combination with the improved pulling-over mechanism, means whereby after the initial stretching operation has been performed, the drawn or stretched upper may be moved upon the last if necessary for the purpose of centralizing it thereon or more correctly locating it, such adjustment of the upper being brought about without relaxing the strain upon the upper.

It is also a feature of the improved pincer mechanism that the pincer devices are combined with the wiping and tacking devices, and, to a certain extent, are actuated by the same mechanism, as will be hereinafter explained.

The pulling-over mechanism, as a whole comprises, as usual, three sets of pincer devices, one for the toe and one for each side, there likewise being three wiper devices, one corresponding with each pincer device and serving to operate upon the same part of the work. These wiper devices really form part of the pincer mechanism and therefore will hereinafter be included within the meaning of the term "pincer mechanism" which refers to the combined pincer device and wiper device, the latter being more appropriately designated the pincer frame seeing that the pincer device is carried and partly actuated thereby.

It will be understood therefore that the "pulling-over mechanism" comprises three "pincer mechanisms" consisting of one toe pincer mechanism and two side pincer mechanisms.

The toe pincer mechanism is suitably pivoted and the side pincer mechanisms are mounted upon trunnions whereby it and they can oscillate and move inward and outward toward and from the center of the machine.

This oscillatory movement of the pincer mechanisms is imparted from a vertically disposed lever through the medium of a link to the toe pincer mechanism and through the medium of bell-crank levers and coupling devices to the side pincer mechanisms as will be hereinafter explained.

A further important feature of the invention comprises an arrangement of the gripper jaws of the pincer devices whereby they are rendered capable of yielding bodily in relation to the pincer cases during the indraw motion of the latter and without relaxing their pull upon the upper. This allows the gripper jaws to constantly maintain a direct and straight pull upon the upper and obviates any material increase of strain upon the upper during the indraw motion as occurs in pincer or gripping devices having jaws not adapted to yield in this manner. This feature is preferably embodied in the side and toe pincer devices, although it may be omitted from the toe pincer device and used in the side pincer devices only, if desirable.

Various other features of the invention will be referred to and described later, and to enable the invention to be clearly understood, reference will be made in the following further description, to the accompanying drawings wherein is shown, by way of example, a practical form of machine embodying the present improvements.

In the drawings referred to:—

Figure 6:
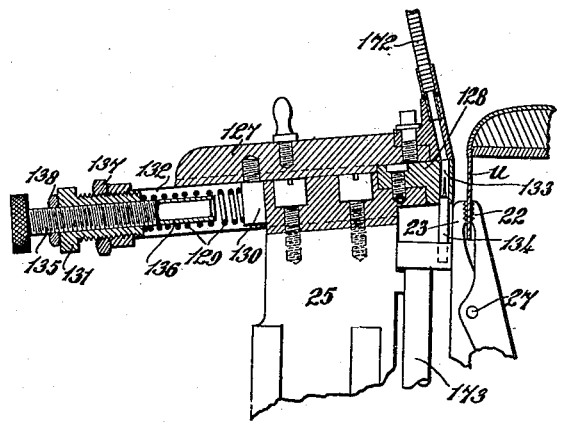
Fig. 6 is a sectional side view of the upper part of a pincer frame.
Figure 6A:
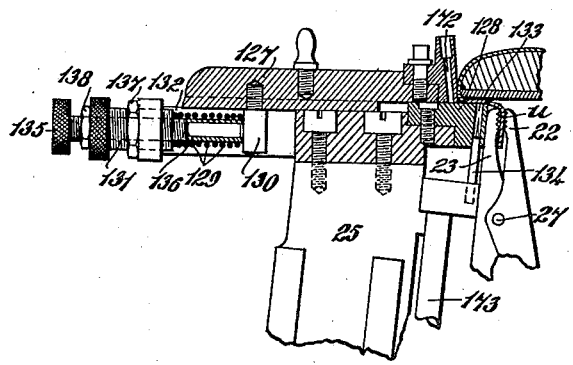

Fig. 6ª illustrates the pressing and wiping in operation.

Figs. 7 and 7ª show in partly sectional side elevation the upper and lower parts respectively of a complete pincer device and its connected actuative mechanism.

Figure 8A:
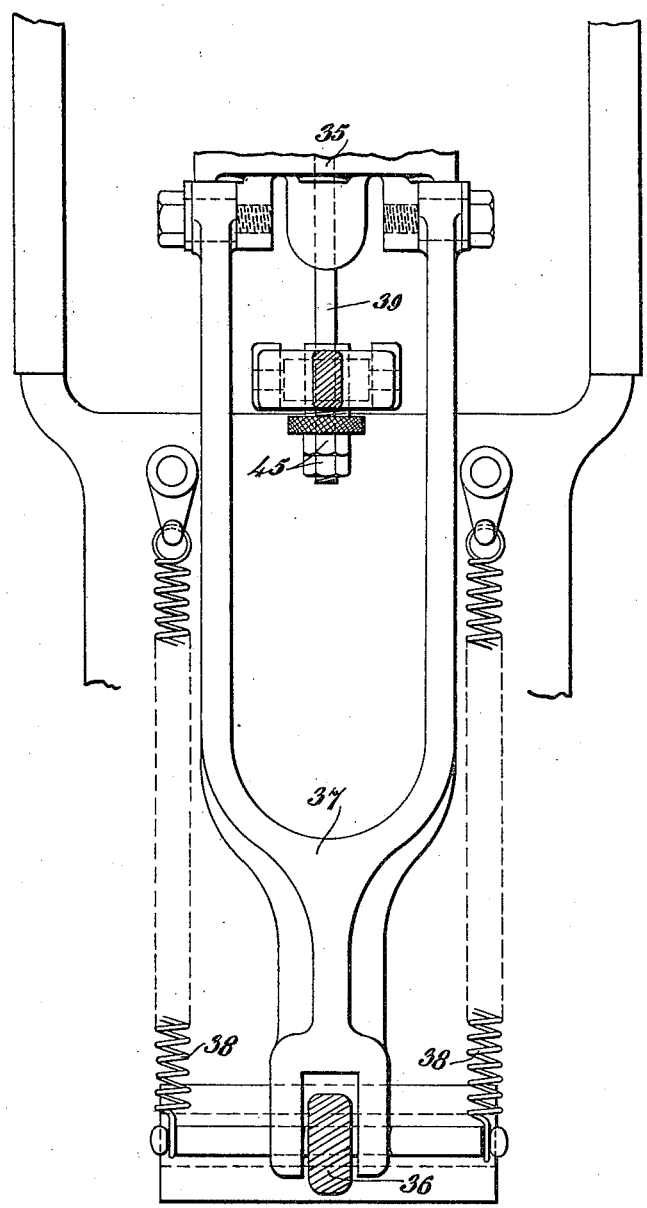

Figs. 8 and 8ª are front views corresponding to Figs. 7 and 7ª respectively.

Figure 9:
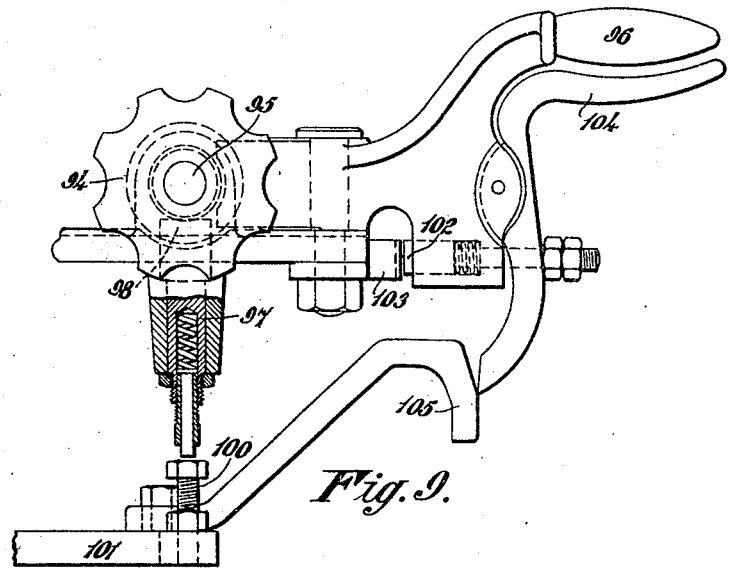
Figure 10:
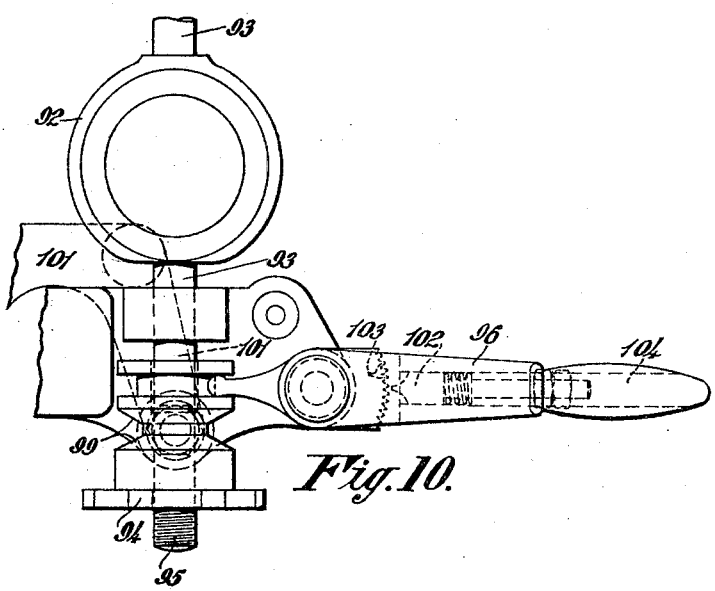

Fig. 9 is an elevation and Fig. 10 is a plan of the manually operable devices for adjusting the side pincer mechanisms relatively to the toe pincer mechanism.

Fig. 11 is an elevation of the treadle locking mechanism.

Fig. 12 shows the cam and connections for releasing the treadle.

Fig. 13 is a side elevation of the vamp presser and its actuating and locking means.

Fig. 14 is a view of said actuating and locking means observed from the left hand side of Fig. 13.

Figure 15:
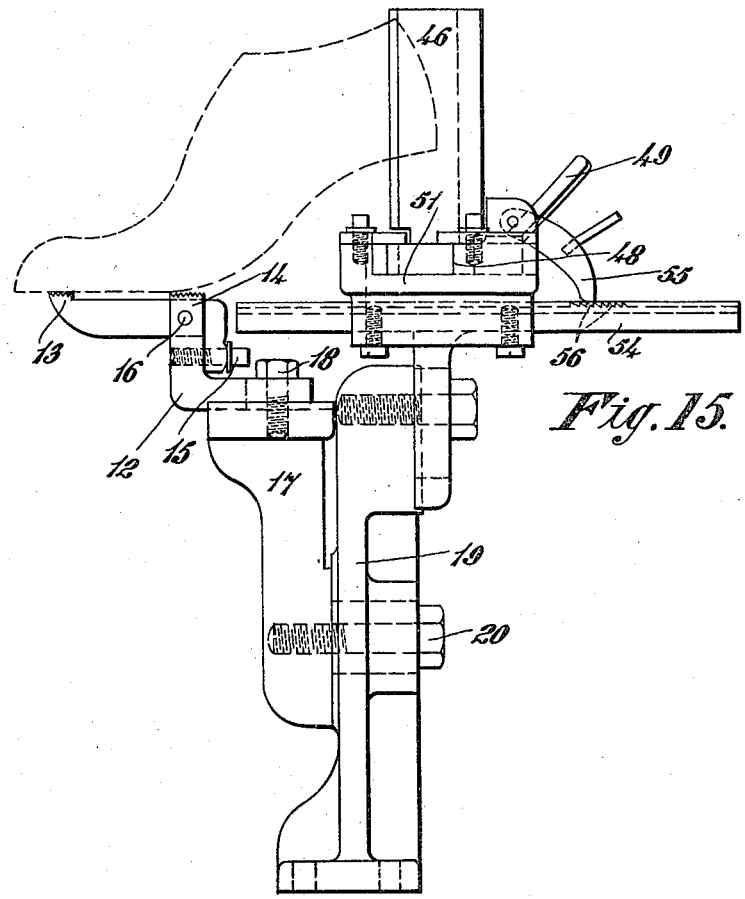
Figure 16:
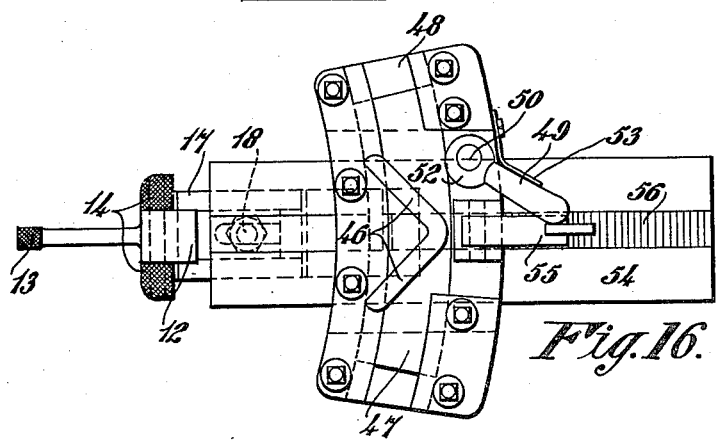

Fig. 15 is an elevation and Fig. 16 a plan of the work supporting means.

Figs. 1, 2, 3, 4, 13 and 14 are drawn to a smaller scale than the other figures, and like parts are designated by the same reference characters throughout the drawings.

The machine comprises generally a frame 1 (Figs. 1, 2 and 3) which, at the front supports the pincer mechanism and work carrying devices (hereinafter referred to), at the top is provided with a work holding arm 2 and a bracket or stand 3 which carries the tack delivery means (not shown), and at the rear is furnished with a main shaft 4 having thereon a driving clutch 5 by which the machine is driven, the motion being transmitted from this shaft to a cam shaft 6 by gears 7 and 8. The clutch 5 is put into operation by the depression of a treadle 9, a reverse movement of the treadle for declutching being effected upon the completion of the cycle of the cam shaft 6 by a cam 10 on the latter, this movement of the treadle also putting into action a brake 11 which arrests the rotation of the main shaft 4. The driving and stopping means just described may be of any known construction.

Figure 1:
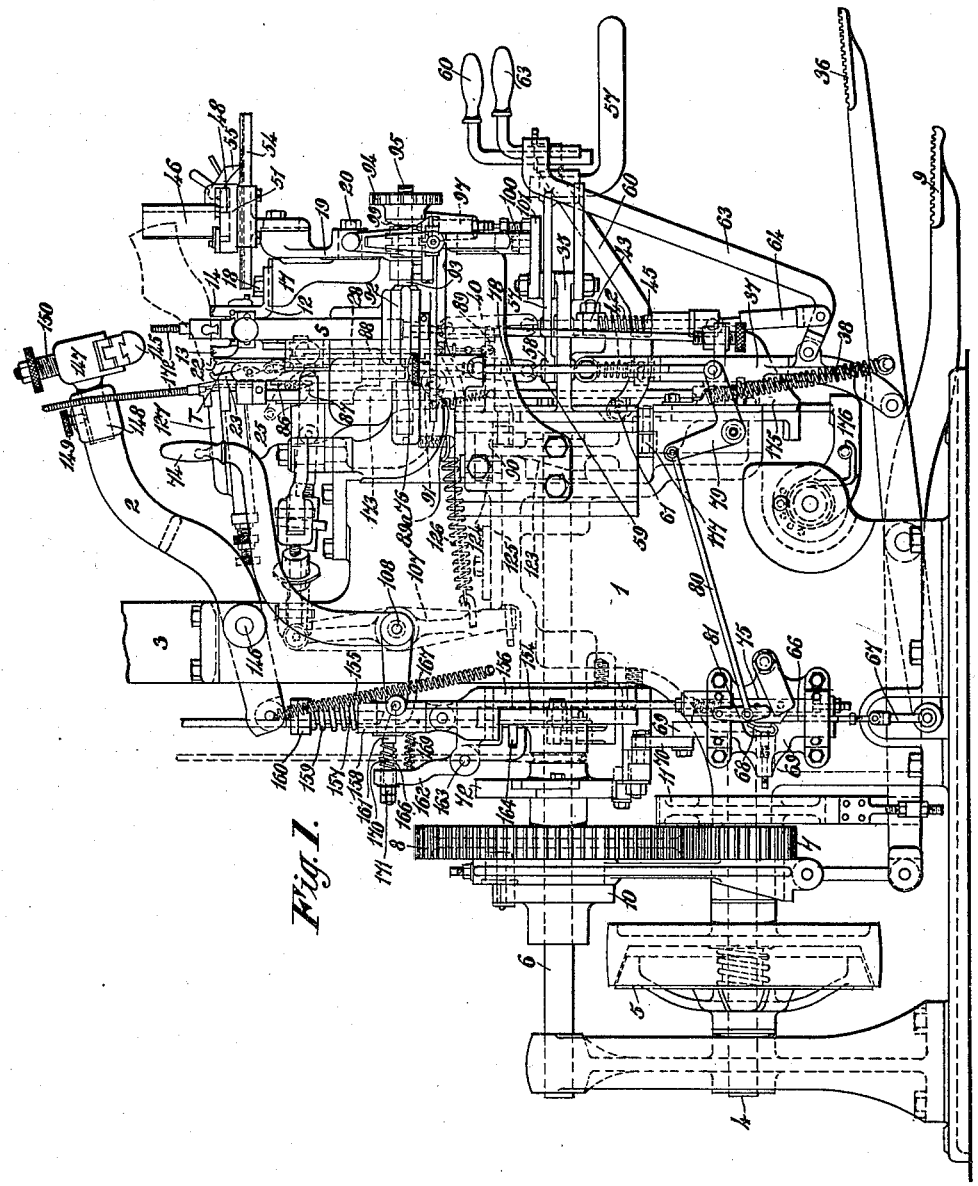
Figure 1 is a side elevation of the machine.
Figure 2:
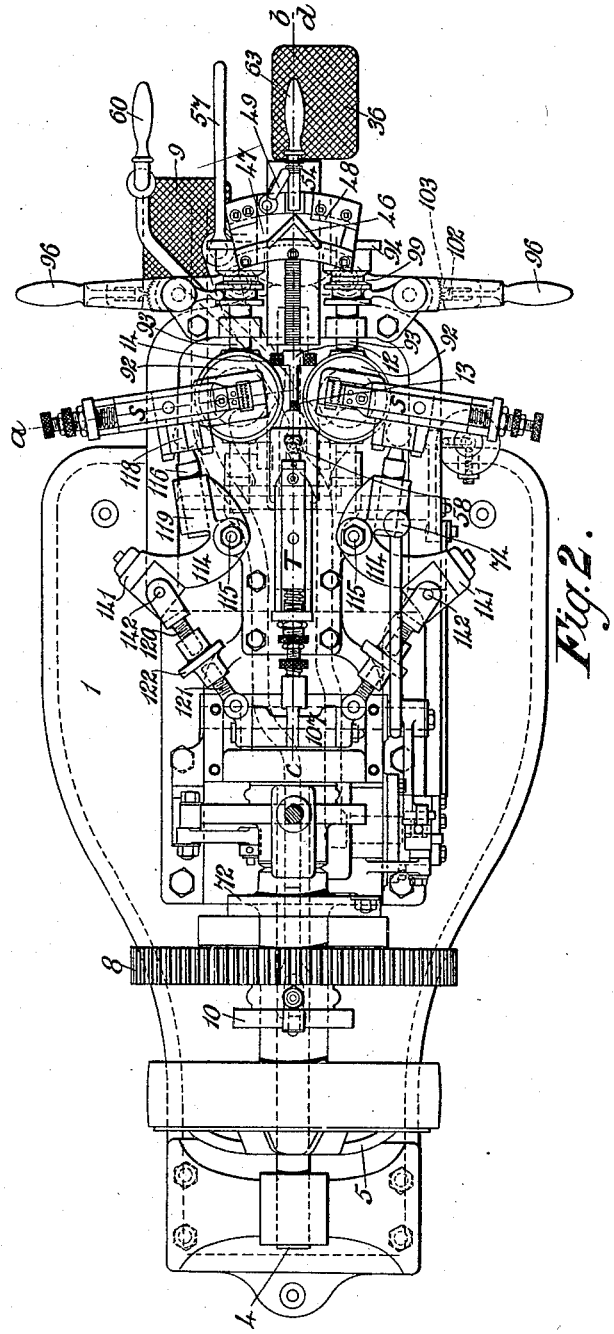
Fig. 2 is a plan of same, the vamp presser being removed.
Figure 3:
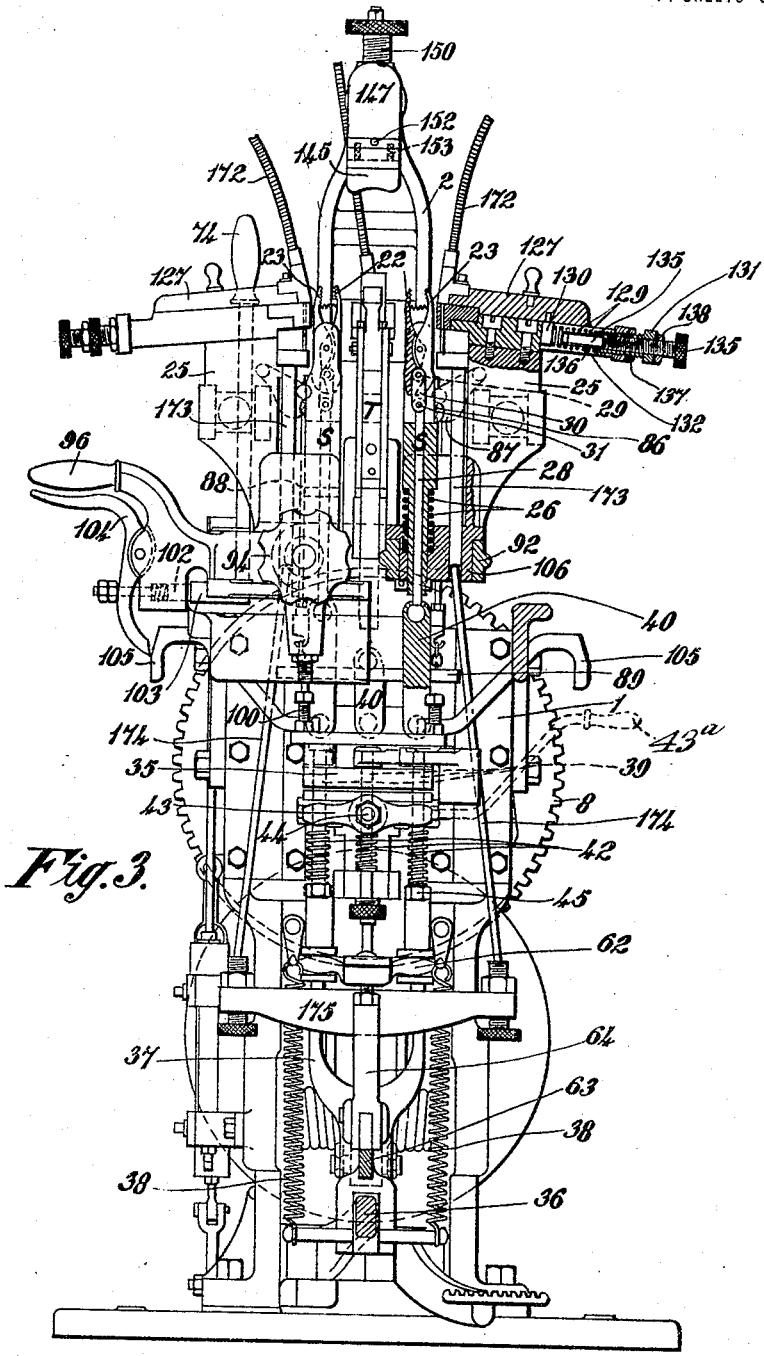
Fig. 3 is a partly sectional vertical front view of the machine, the section being taken approximately on the line a—b of Fig. 2, and the heel and sole rest being removed.

The work to be operated upon is supported mainly by a sole rest 12 (Figs. 1, 2, 15 and 16) having three upstanding serrated or roughened supports disposed as shown in Figs. 2 and 16. These comprise a central forward support 13 to carry the toe of the last and two side supports 14 situated behind the support 13 and adapted to carry the last in the region of the ball or tread. The work rests upon these supports in the manner represented by dotted lines in Figs. 1 and 15 and it will be observed that the insole of the work is supported at three points the relative disposition of these being such that tipping of the work in a forward or lateral direction is prevented.

To accommodate shoes of different sole curvature the support 13 is adjustable in height relatively to its companion supports 14 by means of a screw 15 (Fig. 15) said support being pivoted at 16. The sole rest 12 is adjustable horizontally and longitudinally of the machine upon a bracket 17 for which purpose it is made slidable therein and is fastened after adjustment by a screw 18. The bracket 17 is vertically adjustably mounted upon a stand 19 which also carries a heel rest hereinafter fully described, the stand being rigidly attached to a suitable part of the machine frame 1. A screw 20 secures the bracket 17 in the adjusted position. The two means of adjustment just described enable the sole rest 12 to be positioned longitudinally and vertically of the machine as may be necessitated by the different shapes and sizes of boots and shoes to be operated upon. The support 13 may have a plain surface instead of a roughened one if desired, and further it may be of a shape other than that shown e. g. it may be V-shaped in plan.

At a certain time in the operation of the machine, a spring yielding presser pad on the arm 2 is lowered and caused to press upon the work in the region of the vamp to hold it down firmly upon the sole rest 12. This presser device and its operation will be more fully described later.

It will be observed that the work is as previously mentioned, supported in an approximately horizontal position with the insole facing downward thus enabling the operator to have the upper and top side of work well in view during the whole of the initial stretching operation.

Figure 4:
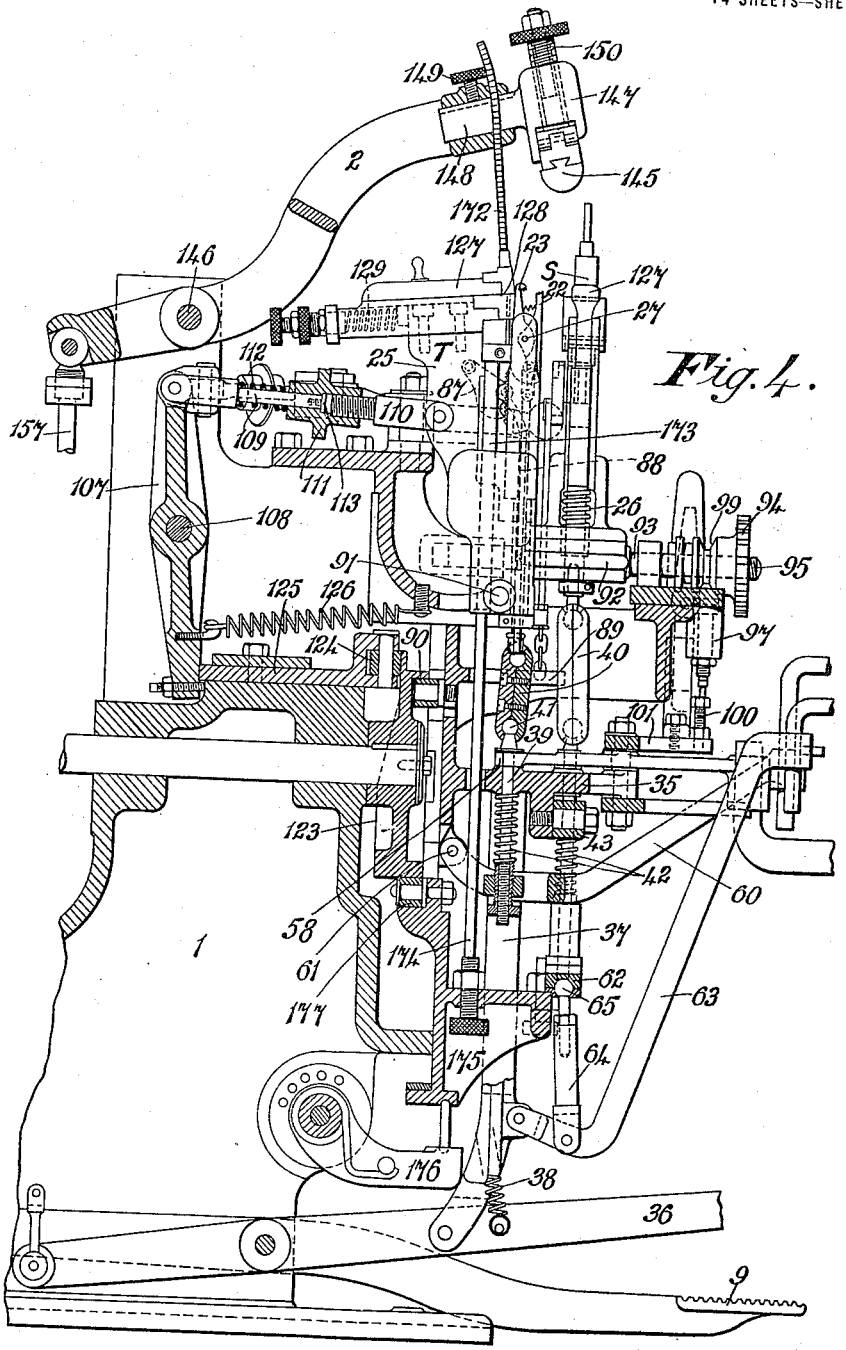
Fig. 4 is a vertical side section of the front part of the machine taken approximately on the line c—d of Fig. 2.
Figure 5:
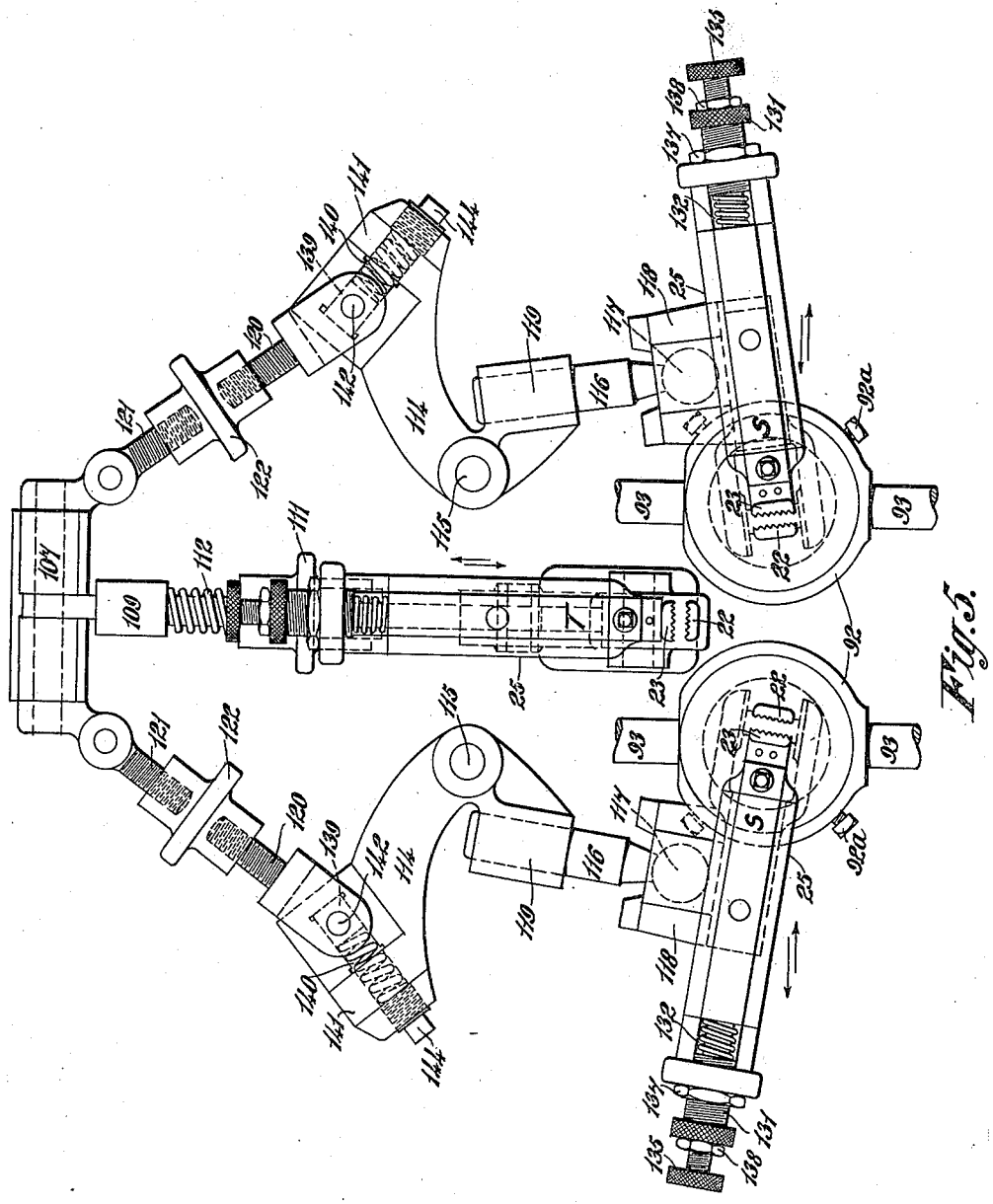
Fig. 5 is a plan of the pincer mechanisms and their connected actuating means.

The three pincer mechanisms are disposed substantially vertically at the front of the machine the general arrangement of these being seen best in Figs. 1, 2, 3 and 4 while the relative disposition of said mechanisms is clearly shown in Fig. 5. In the figures just referred to the references S indicate the side pincer mechanisms and the reference T indicates the toe pincer mechanism, these references being employed to designate each respective mechanism as a whole and not any particular part thereof.

The pincer device of each pincer mechanism comprises two jaws 22, 23 (Figs. 7 and 8) mounted in an outer case 24 which is slidable up and down in a frame 25 hereinafter termed the pincer frame, a spring 26 being combined with the case and frame to effect an upward movement of the pincer device in the frame. The gripping jaws 22, 23 are arranged upon a pivot pin 27 so that they are capable of relative movement to open and close, this movement being brought about by the actuation of an inner rod 28 slidable in the pincer case 24.

To admit of the previously mentioned yielding movement of the pincer jaws taking place within the pincer case, there is provided for actuating these jaws from the inner rod 28, a device, which, while it remains in connection with the said rod and maintains an operative connection between the rod and the jaws, is adapted to turn or move on the rod and thus follow the movements taken by the gripping jaws while they are holding the upper.

A convenient form of this device consists of a roller 29 carried by a pair of links 30 said roller being located at one end of and between the links which at their opposite ends are attached by a pin 31 to the upper end of the inner rod 28. The jaws 22, 23 are furnished with converging curved or inclined extensions 32 between which the aforesaid roller 29 works, said extensions being so shaped that a downward movement of the roller therebetween will force relatively outward the extension of one of them relatively to the other, and thereby effect closing of the gripping ends of the jaws, said roller acting with a wedge-like action upon the two extensions to cause the jaws to tightly grip the upper situated between them.

In those pincer mechanisms where the gripping jaws are to be capable of yielding bodily in relation to the pincer cases as previously mentioned, the pair of jaws are pivotally mounted in the pincer case, this pivot being by preference the same as that upon which the jaws open and close i. e. the pin 27. To enable the jaws to turn on this pivot while they are held closed to grip the upper, the links 30 carrying the previously mentioned roller 29 which effects the closing of the jaws, are pivotally connected to the upper end of the inner rod 28 so that they can turn on the axis of their connecting pin 31 and thus allow the roller to move in company with the jaw extensions as the jaws turn on the axis 27. Thus while the inner rod 28 of the pincer device is held down to maintain, through the links 30, roller 29 and jaw extensions 32, the bite of the jaws 22, 23 upon the upper, the jaws may be tilted bodily in relation to the pincer case 24, the tilting movement taking place on the axis 27, and the roller following the said movement. When the jaws are both movably mounted in the pincer case to yield by tilting in the aforesaid manner, a spring or springs may be suitably arranged to return the jaws to a normal position after they have moved therefrom. Conveniently these means may take the form of a blade spring 33 attached to the pincer case 24 and pressing upon one of the pincer jaws (preferably the inner jaw 22).

For opening the jaws 22, 23 when an upward movement of the inner rod 28 is permitted or imparted, a spring 34 may be arranged between said jaws as shown in Fig. 7, or otherwise conveniently.

While it may be so arranged that in closing, the jaws shall each move toward the other, it is preferred that one jaw (the outer 23) shall close upon the other. The purpose of this provision is that when the pincer device is closing its grip upon the work, the inner jaw 22 shall not move away from that part of the upper u (Fig. 7) which is to be gripped, consequently the outer jaw 23 presses the upper against the inner jaw without disturbing the work. The inner pincer jaw 22 may conveniently be held from movement during the closing action by the pressure of the aforesaid blade spring 33 or an equivalent, which serves to yieldingly hold the jaws in a normal position in the pincer case 24.

The jaws are normally open and the pincer case 24 occupies (as shown in Figs. 7 and 8) a raised position in the pincer frame 25. After the edge of the upper $u$ has been inserted between the open jaws, 22, 23 of the pincers, the inner rod 28 is pulled down, the motion of which by means of the connected roller 29 or jaw closing device, first causes a closing movement of the jaws to take place as aforesaid, and thereafter, when the jaws are tightly closed upon the upper, a bodily downward movement of the pincer case 24 in the pincer frame 25 against the action of its spring 26.

The inner rods 28 of the three pincer mechanisms have an indirect yielding connection with a slide 35 (Figs. 1, 3, 4, 7$^a$ and 8$^a$) which in turn is connected to a stretching treadle 36 by means of a link 37 said treadle being normally held raised by springs 38.

The slide just referred to is movable up and down a guideway on the machine frame 1 and carries slidable rods 39, to the upper ends of which the lower ends of the inner rods 28 are connected by couplings 40. The ends of the slide rods and inner pincer rods are jointed to the intermediate couplings 40 by ball and socket joints 41. This arrangement admits of the movement of the pincer devices, hereinafter to be described, to take place without dislocating the operative connection between the treadle actuated slide 35 and the inner rods 28 of the pincer devices.

The slide rods 39 in the slide 35 have springs 42 (Figs. 1, 3, 4 and 7$^a$) combined therewith so that said slide will as it moves downward actuate the slide rods through the medium of the springs whereby the slide rods will operate with a yielding pull upon the inner rods 28 of the pincer mechanisms. In order to make provision for compensation between the springs of the pincer devices of the side pincer mechanisms S in the event of it becoming necessary for these devices to be pulled down unequally *i. e.* to different extents, the springs 42 on the actuating slide rods 39 of these devices bear against a rocker bar 43 (Figs. 1 and 3) carried by the slide 35, which bar is centrally pivoted on a horizontal pivot 44 and adapted to automatically rock vertically on said horizontal pivot either one way or the other to balance the springs as they are compressed and thus insure an equal strain upon each side of the upper. For instance, it may be necessary, in order to properly strain the upper over the last, for one pincer mechanism to be drawn down lower than the other, in which case when the slide 35 is drawn down and compresses the springs 42 on the slide rods 39, the bar 43 will turn on its pivot 44 so that the springs between it and the lower ends of the slide rods will be compressed to the same extent.

It is the compression of these slide rod springs 42 which imparts a pulling strain upon the upper when the pincers are drawn down, and as this compression is effected solely by the depression of the treadle 36 by the operator, it will be understood that the amount of the pulling strain exerted upon the upper may be varied by correspondingly varying the depression of the treadle. The slide rods 39 have nuts 45 thereon to engage the springs 42 so that by adjusting the nuts the pressure of the springs may be varied.

Any means equivalent of the aforesaid rocker bar 43 may be employed for automatically balancing the springs 42 of the side pincer devices to compensate for unequal movement of said devices.

In connection with this balancing bar 43 or equivalent device there may be provided means whereby said bar or device may be manually operated to bring about an opposite relative movement of the two side pincer devices to shift the upper over the last while the pulling or stretching strain is maintained.

The purpose of such provision is to enable the operator—after the initial stretching operation has been performed by the depression of the treadle 36—to adjust, if necessary, the upper on the last.

To this end the rocker bar 43 may have attached thereto a handle 43$^a$ by the manipulation of which the said bar may be positively turned upon its pivot 44 one way or the other thereby altering the compression of the slide rod springs 42, increasing one and decreasing the other with the object of causing the respective pincer devices to move downward and upward and shift the upper laterally over the last. To prevent movement of the last during this operation, suitable means may be provided to engage the last, a convenient form of such means consisting of an angular or other rest or support adapted to be pressed up to the back of the work to engage same on opposite sides thereof. This rest may be adjustable and locked by appropriate means.

The means just referred to and also previously mentioned herein, additionally to preventing lateral or twisting movement of the last, serve also to holding the last against backward movement which is likely to be caused by the pressing and wiping in action of the toe pincer mechanism T which operation will be hereinafter described. A concrete form of this rest is illustrated in Figs. 15 and 16, said rest being shown in position on the machine in Figs. 1 and 2. It consists of an angular or concave support or rest plate 46 adapted to engage the back of the last and partly embrace the same to support it against movement both rearward and laterally. This device hereinafter designated the rest, is mounted upon a plate 47 movable to and fro along an arcuate slideway 48 which is preferably approximately concentric with a point corresponding to the position of the toe of the last. By moving the rest along the arcuate slideway its position may be varied laterally to suit lasts of different shapes and by reason of the concentricity of the said slideway, the rest 46 will—irrespective of its lateral position— always bear a suitable relation to the last to take the pressure approximately at right angles to the center line of the last.

The rest is prevented from free movement along the slideway 48 by a locking device which is normally operative but which may be manually released when the position of the rest is to be altered. Conveniently this device comprises a handle 49 (Fig. 16) partially rotatable upon a pin 50 on a block 51 upon which the slideway 48 is formed, said handle having a cam or eccentric 52 thereon adapted, when the handle is in a certain position, to bear against the side of the slidable plate 47 carrying the rest 46 and frictionally lock the same against movement along the slideway. The handle 49 has combined with it a spring, such for example as a blade spring 53 which holds it in the locking position. To adjust the rest 46 laterally, the operator releases the lock by the handle 49 with one hand and moves the rest to the desired position by the other.

The block 51 having the slideway 48 is movably arranged upon a member such as a bracket 54 attacehd to the previously mentioned stand 19 on the machine frame, said block being slidable toward and from the pincer mechanisms i. e. in a direction transverse to the direction in which the rest is laterally adjustable. By this arrangement the rest 46 is capable of both lateral adjustment and adjustment relatively to the toe pincer mechanism T and thus will accommodate lasts of different shapes and lengths. To hold the device against backward movement, the slidable block 51 may carry a pawl 55 which engages the teeth of a rack 56 fixed or formed upon the bracket 54. As the device i. e. the block 51 and rest 46 carried thereby is pushed forward by the operator, the pawl 55 rides over the teeth of the rack 56 and will serve to hold the rest in any position to which it may be moved. To move the rest backward, the pawl 55 is raised from the rack 56 by hand.

In order to facilitate the insertion of the edge of the upper u into the open pincer jaws 22, 23 and the correct positioning of the work in the machine, it is preferable that the toe portion of the upper should be gripped and held by the toe pincer device before the closure of the side pincer jaws takes place.

In the present improved machine there is therefore provided means for effecting the closure of the toe pincer jaws independently of the side pincer jaws this operation being performed by the operator. A convenient construction of the means referred to, consists of a spring controlled knee lever 57 (Figs. 1, 2, 4 and 7) pivoted upon the before mentioned slide 35 and having at its inner end a slotted boss or projection 58 normally occupying a position underneath a shoulder or collar 59 on the actuating slide rod 39 of the toe pincer device, said boss 58 holding such rod raised against the action of its spring 42 which is normally under compression. A movement of the knee lever 57 by the operator after he has inserted the toe edge of the upper between the toe pincer jaws 22, 23—these being normally open— withdraws the boss from under the shoulder or collar 59 on the slide rod whereupon the latter—under the influence of its spring— moves down and closes the pincer jaws upon the upper. It is arranged that this downward movement of the slide rod while being sufficient to close the jaws and grip the upper, shall not move the toe pincer device downward.

To enable the operator to open the toe pincer jaws after they have been closed, for instance if he discovers that the toe part of the upper is not correctly inserted, a hand lever 60 (Figs. 1, 2, 4 and 7ª) is provided on the slide 35 pivoted at 61 and adapted when raised to lift the slide rod 39 connected with the inner rod 28 of the toe pincer device, which movement effects the opening of the jaw and also raises the shoulder or collar 59 on the said slide rod above the boss 58 of the knee lever 57 whereupon, the latter—actuated by a suitable spring— returns to the normal position and locks the jaws in the open position again. This hand lever may have an adjustable connection with the slide rod.

It may be mentioned here that it is not essential that the toe pincer jaws should be primarily closed by the actuation of the knee lever, as although this provision is made for the sake of convenience and to facilitate the positioning of the work, the toe pincer jaws will—if the knee lever is not used—close simultaneously, or approximately so, with the side pincer jaws when the treadle 36 is depressed.

When after the work has been correctly positioned and the side edges of the upper u inserted between the open jaws 22, 23 of the respective side pincer devices, the treadle 36 is depressed, the side pincer jaws are closed to grip the upper and the toe pincer device moves down in company with the side pincer devices. In this operation when the treadle is depressed, the toe pincer jaws, having been previously closed, move downward while the side pincer jaws are closing and thus the toe pincer device when moving in company with the side pincer devices is somewhat in advance of these.

The downward movement of the pincer devices just mentioned is effected by the pull of the inner rods 28 which after closing the jaws upon the upper operate through the jaws upon the pincer cases 24 pulling these down in the pincer frames 25 against the action of the springs 26.

It is found expedient to make some provision whereby, during the stretching operation and in opposition to the constant pull such as is exerted upon the upper when the treadle 36 is gradually depressed and held, either by the operator or mechanically, against upward movement as it is depressed, the pull upon the upper may be relieved to a greater or lesser extent as required at intervals until the stretching operation is completed. That is to say, instead of stretching the upper over the last by means of a pull the strain of which is gradually increased up to the maximum, better results are obtained if, during the stretching operation, the pulling strain upon the upper is relieved at intervals, such intermittent straining and relieving acting to, what may conveniently be called, humor the upper, and facilitate the stretching of the same over the last more evenly and tightly and without destroying the nature of the material than when a constantly increasing strain is employed.

In order that this intermittent relief may be effected during the operation of depressing the stretching treadle 36 and without interfering with such operation, means are provided for moving the pulling devices independently of the treadle such means being preferably manually operable. Conveniently the relieving means are arranged in connection with the slidable rods 39 which pull down the inner rods 28 of the pincer mechanisms, and although said means are more especially applicable to the side pincer mechanisms S similar provision may be made in connection with the toe pincer mechanism T.

The said means comprise a connection, such for example as a bar 62 (Figs. 3 and 4) between the lower ends of the slidable rods 39 of the side pincer mechanisms S, the bar being operable by a lever 63 and link 64 to raise the said slidable rods in the actuating slide 35. The lever 63 is pivoted upon the beforementioned link 37, the link 64 being jointed to the bar 62 by a ball joint 65. The slidable rods 39 are raised in the slide 35 when the lever 63 is raised, and when so moved they act against the springs 42 which are combined with them. The connecting bar 62 is arranged in such a manner that it can rock if necessary and thus adjust itself in correspondence with the balancing movement of the slidable rods 39 and their springs 42 which has been previously described herein.

As regards the toe pincer mechanism T, the hand lever 60, previously referred to, for opening the toe pincer jaws, may also be employed during the stretching operation for relieving the strain of the pull upon the upper at the toe, or if desired the lever 63 for the side pincer mechanisms may be arranged to control the toe pincer mechanism as well, but it is usually at the sides where the upper requires humoring.

In the employment of the means just described, the operator imparts the stretching strain by gradually depressing the treadle 36, and at the same time he manipulates the relieving lever 63 to relieve the pull upon the upper at intervals as may be required to facilitate the process of evenly and nicely pulling the upper over the last. It will be understood that as the relief is effected by compressing the springs 42 of the slidable rods 39, such springs will expand to impart further strain when the relieving lever 63 is released or the pressure removed therefrom.

After being depressed and drawn down to effect the initial stretching of the upper over the last, the treadle and pincer devices are automatically locked to maintain the upper in the strained condition over the last while the indraw and wiping action of the pincer devices takes place, during which action the grip of the pincers on the upper is relaxed whereupon the tacking operation occurs, and finally the pincers are automatically returned to their normal raised and open position preparatory to dealing with the next piece of work.

For a purpose hereinafter appearing, the treadle and pincer devices are locked by separate mechanisms these being independently controlled. While it is not intended to confine the invention to the use of any particular form of locking mechanism either for the treadle or pincer devices, it is found that certain constructions of mechanisms are particularly suitable for the purpose, which constructions will therefore now be described by way of example.

The treadle locking mechanism is illustrated in Figs. 1, 11 and 12 and comprises a slidable rack 66 connected to the treadle 36 by a link 67, a spring actuated pawl 68 mounted upon a slide bar 69 engaging the rack 66 to hold the treadle after depression against rising. The pawl 68 locks the treadle 36 in whatever position it may be moved down to. The pawl slide bar 69 is normally stationary but by means of a link 70 and rock lever 71 (Fig. 12) is actuated at a certain time by a cam 72 on the cam shaft 6 to move the pawl 68 into contact with a projection 73 whereby it is disengaged from the rack 66 to release the treadle 36 which is thereupon raised by its springs 38. Combined with this treadle locking mechanism is a hand lever 74 (Fig. 1) by which the operator may move a slide 75 carrying the before mentioned projection 73 to effect the release of the treadle independently of the cam 72. This provision is made in order that the operator may release the work from the pincer devices after the stretching operation has been performed if he finds that the work requires to be repositioned or altered. Such release of the treadle allows the pincer devices to return to the normal open and raised position.

The treadle locking mechanism arranged as just described is operative to mechanically hold the treadle from rising during the whole time the latter is being depressed. Thus all the operator need do is to press the treadle down to stretch the upper the locking taking place automatically. It may, however, be desirable in some cases to postpone the locking of the treadle until the stretching operation is partially or wholly completed, the treadle being entirely under the control of the operator during such period of postponement. To this end there may be provided in combination with the aforesaid locking mechanism, an arrangement of means as shown in Figs. 1 and 11, comprising a plunger knob 76 arranged in a suitable part of the machine frame 1 so as to be readily accessible by the operator, said knob being movable up and down in a socket 77 and having connected thereto a rod 78. A bell crank lever 79 transmits movement from rod 78 to a rod 80 which is attached to a pivoted plate 81 adapted when occupying a rearward position when the knob 76 is up, to hold the pawl 68 away from the rack 66 so that the treadle 36 does not become locked. Upon the knob 76 being pressed down, the plate 81 is moved forward by the intermediate connections and allows the pawl to engage the rack 66 to lock the treadle. The knob 76 may be held in the raised position by a spring pressed pin 82 which enters a groove 82ª in the knob. A spring, such as 83, (Fig. 11), may or may not be arranged under the knob to assist the resetting movement of the mechanism such spring however, is used, being weak enough to allow the spring pin 82 by pressure against the side of the plunger knob to hold the knob down. The mechanism may be reset automatically by a bracket 84 (Fig. 11) attached to the before mentioned treadle link 37 engaging and lifting as the treadle rises an adjustable collar 85 on the rod 78. It will be seen that normally the pawl 68 is held clear of the rack 66 and thus the operator when depressing the stretching treadle 36 has complete control of same. When during or on the completion of the stretching operation he wishes to lock the treadle against rising he depresses the knob 76 whereupon the pawl 68 comes into action as aforesaid. If it is not desired to postpone the locking of the treadle, the collar 85 is moved away from the bracket 84 so that the knob may remain depressed.

The pincer device locking mechanism is also of the rack and pawl type and is shown in Figs. 1, 3, 4, 7 and 8. Each pincer case 24 is furnished with a rack 86 which is engaged by a spring actuated pawl 87 on the pincer frame 25 to lock the pincer devices in whatever position they may be moved down to. These pawls 87 are each connected by a rod 88 with a slidable bracket 89 on the frame of the machine. The connecting rods 88 are suitably jointed to short adjustable connections on or in the bracket 89 and thus allow the hereinafter described movements of the pincer mechanisms to take place without dislocating the operative connections between the bracket and the pawls. These connections have a certain freedom of vertical movement so that the pawls can operate automatically to lock the pincer cases. At certain times the bracket 89 is operated by a cam 90, being permitted to rise to allow the pawls 87 to come into operation to lock the pincer devices, and being lowered to pull down the rods 88 to disengage the said pawls from the racks 86 for the purpose of releasing the pincer devices.

While the treadle 36 is being depressed to initially stretch the upper, the power driven parts of the machine are stationary, the cam 90 being in a normal position and holding the slide bracket 89 down so that the locking pawls 87 of the pincer devices are at this stage, held out of action thus allowing, if necessary, the pincer device to be raised and opened to alter the work, this being effected in the manner hereinbefore described. When the machine is put into operation by depression of the treadle 9 after the initial stretching operation has been completed, the slidable bracket 89 is permitted by its cam 90 to be raised by springs 89ª (Fig. 1) and allows the pawls 87 to lock the pincer cases 24 as aforesaid so that when the treadle 36 is subsequently released, the said pincer cases will be held from rising in the pincer frames 25 for a purpose hereinafter appearing.

Upon the machine being set in motion the pincer mechanisms S and T are moved inward toward the work. The pincer frame 25 of the toe pincer mechanism is pivoted at 91 (Figs. 4 and 7) to a suitable part of the frame 1 and is movable lengthwise of the machine as indicated by arrows in Fig. 5. The pincer frames 25 of the side pincer mechanisms are supported in collars 92 (Figs. 1, 2, 3, 4 and 5) having trunnions 93 carried in the machine frame 1 in such a manner that each side mechanism can turn on said trunnions in a direction laterally of the machine i. e. toward and from each other as indicated by arrows in Fig. 5.

The trunnions 93 are preferably so disposed in relation to the pivot 91 of the toe pincer mechanism T that the relative movements of the side pincer mechanisms S will take place along lines at right angles to the center line of the last. That is to say the side pincer mechanisms S operate in alinement with each other the axis of the trunnions 93 being parallel as shown in Fig. 2. It may, however, be found desirable to so arrange the said trunnions that the side pincer mechanisms S will have a movement along lines having an angular relationship as contradistinguished to the before mentioned alined movements of the mechanisms. For instance, the axes of the trunnions may be disposed on lines which are radial from the center of the heel, or approximately so. Or instead of being convergent toward the heel said axes may be divergent. Or again the axes of the trunnions may be so disposed as to allow the pincer mechanisms S to move in a direction approximately at right angles to that portion of the edge or corner of the last around which the upper is to be drawn. In either case the side pincer mechanisms can be turned and set in the trunnion collars 92 to any desired angle to suit various forms of lasts as will be hereinafter explained.

In order that the side pincer mechanisms S may be adapted for dealing with "rights" and "lefts" and different lengths and widths of toes, certain adjustments are provided for whereby the angle and normal position of said devices may be altered, and also whereby the position of said devices may be altered in relation to the toe pincer device, both initially and during and upon the completion of the operation of stretching the upper over the last.

To this end the trunnions 93 are slidable endwise in their bearings such movement being brought about when required by hand wheels 94 (Figs. 1, 2, 3, 4, 9 and 10) which coöperate with a screw threaded extension 95 of the trunnions. A hand lever 96 is arranged in connection with each hand wheel 94 by the manipulation of which, the hand wheel, and consequently the pincer mechanisms, can be quickly moved bodily in relation to the toe pincer mechanism T i. e. along the line of the axis of the trunnion in either direction. Thus if during or on the completion of the initial stretching operation the operator finds it desirable to shift either side of the upper in relation to the toe, he can do so by moving the hand lever 96 of the side pincer mechanism concerned and can thereby obtain an instantaneous adjustment of that part of the upper requiring attention. Such adjustment is temporary and only necessary when the upper of the boot or shoe is very distorted.

Combined with this adjusting mechanism is an arrangement of means for automatically resetting the side pincer mechanisms S i. e. returning them to the normal position on the completion of the operation of the machine. Such means conveniently comprise a plunger 97 (Figs. 1 and 9) having a tapered end 98 adapted to coöperate with a groove 99 in the hand wheel boss having inclined sides. At a certain time the plunger 97 is actuated by an adjustable screw 100 in an arm 101 attached to the slide 35 and is moved into engagement with the groove 99 and by contact with either inclined side thereof causes an endwise movement of the trunnion 93 and thereby shifts the pincer mechanism to the normal position. At other times viz. when the slide 35 is down, the plunger 97 is clear of the groove 99 so that movement of the pincer mechanism S may be effected by the hand lever 96.

The hand levers may have locking means combined therewith such for example as a spring pressed sliding tooth 102 engaging a fixed toothed segment 103 to hold the hand lever in whatever position it may be moved to. When the hand lever is to be moved by hand the locking tooth 102 is drawn back by a grip-lever 104. To enable the pincer mechanism to be mechanically reset as previously described, the locking tooth 102 is automatically withdrawn, when the slide 35 rises, by a lateral extension 105 on the arm 101 which makes contact with and moves the grip lever 104.

When the machine is at rest the slide 35 occupies a raised position and consequently the plungers 97 will at such time hold the hand wheels 94 in a normal position. Upon said hand wheels being rotated they will effect adjustment of the side pincer mechanisms S relatively to the toe pincer mechanism T seeing that they are held from movement themselves. Whatever adjustment of the side pincer mechanisms may afterward be made by manipulation of the hand levers 96 during the stretching operation does not alter the normal correlation of the pincer mechanisms seeing that at the end of the operative cycle of the machine, the hand wheels are automatically returned to the same normal position.

As has been previously mentioned, the side pincer mechanisms S are each capable of rotary adjustment so that the angular relation of said mechanism to the work may be altered as required. To this end a shank 106 on the bottom of pincer frame 25 is rotatable within the supporting collar 92 the latter having set screws 92ª (see Fig. 5) or other convenient means for fastening said shank after such rotary adjustment has been effected.

The oscillatory movement of the pincer mechanisms on their pivots 91 and 93 is imparted by a vertically disposed lever 107 (Figs. 1, 2, 4 and 5) fulcrumed on a pin 108 carried by the frame 1. From this lever 107 the movements are transmitted to the different pincer mechanisms through the medium of intermediate connections which, in the case of the pincer mechanism T, comprise a coupling, and in the case of the pincer mechanisms S, comprise an arrangement of bell-crank levers and couplings as will now be described.

The coupling between the lever 107 and the pincer frame 25 of pincer mechanism T is seen best in Fig. 4, and comprises a rod made in two parts, the part 109 being pivotally attached to the top of the lever 107, and the other part 110 being similarly attached to the pincer frame 25. These two parts 109, 110 are connected by a rotary nut 111 screwed upon the part 110, the adjacent end of the other part 109 being slidable in said nut and having a compression spring 112 interposed between a shoulder thereon and the opposing end of the nut. Complete disconnection of the part 109 from the nut 111 is prevented by the head of a screw 113 at the end of said part the head being of larger diameter than the end of the part 109 and working in a cavity in the nut. The effective length of the coupling is varied by rotating the nut 111, which variation is employed to adjust the toe pincer mechanism relatively to the actuating lever 107 when necessary. The provision for yield in this coupling member prevents undue strain upon the upper at the toe during the wiping in movement of the toe pincer mechanism, and also admits of the presser device of this mechanism having a limited movement as will be hereinafter described.

The intermediate actuating means of the pincer mechanisms S will be best understood by reference to Fig. 2 or 5. The means comprise bell-crank levers 114 fulcrumed at 115 to the machine frame 1, each of said levers being furnished with a rod 116 ball and socket jointed at 117 to a block 118 slidably mounted in the pincer frame 25 of the side pincer mechanisms. The ball and socket joint 117 and slidable block 118 allow the oscillating movement of each pincer mechanism S to take place without causing a stiffening of the connection between the pincer frame 25 and actuating bell-crank lever 114. The rods 116 are slidable within bosses 119 on the bell-crank levers 114 for the purpose of allowing the before mentioned adjustment of the pincer mechanisms S along the lines of the axes of the trunnions 93 taking place.

The bell-crank levers 114 are coupled to the vertical actuating lever 107 by an adjustable coupling consisting, for example, of a right handed screw 120 and a left handed screw 121 connected by a rotatable nut 122. By the rotation of this nut the position of the side pincer mechanisms S in relation to each other and to the work may be altered as required, the lengthening and shortening of these couplings effecting respectively an inward and outward movement of the said mechanisms.

The vertical actuating lever 107 is operated in one direction (to impart the inward movement to the pincer mechanisms) by a cam edge 123 on the innerside of the previously mentioned cam 90, said cam edge acting upon the roller 124 of a slide bar 125 which latter presses against the lower end of the lever. The outward movement of the pincer mechanisms and the opposite movement of their actuating lever 107 takes place under the influence of a spring 126 connected at one end to the lever and at the other to a fixed part of the machine frame 1.

The pincer frame 25 of each presser mechanism S, T has, at its upper end, a presser (Fig. 6) comprising a spring pressed slidable member 127 adapted to make contact with the upper and press it against the side or corner of the last as the pincer mechanism moves inward toward the center of the machine.

The said presser may comprise a plate slidable over the wiper 128 this latter being fixed to or formed by the upper portion of the pincer frame 25. The presser plate normally occupies a forward position, as shown in Fig. 6, but when, as the pincer frame 25 moves toward the work, it makes contact with the upper u and its movement is thereby arrested, it yields against the action of its controlling spring 129 as the pincer frame 25 continues to move inward under the work as shown in Fig. 6ª.

The presser plate 127 may be slidably fitted within the upper end of the pincer frame 25 in any suitable manner and the aforesaid controlling spring 129 is arranged to operate between a pin 130 or lug on the underside of the plate and an adjustable screw 131 at the end of a recess 132 in the pincer frame.

The presser devices 127 act upon the work to press the pulled-over upper against the corner of the last for the purpose of preventing the upper slipping or slackening back after it is released by the pincers and before the tacks for securing the edge of the upper are driven in.

During the inward movement of the pincer mechanisms, the upper ends 128 of the pincer frames move inward underneath the work and operate with a wiping action upon the upper, wiping the edge upward against the innersole and holding it in position thereagainst, the beforementioned pressers 127 meanwhile holding the upper against back slacking around the last. The pincer frames 25 have formed therein the tack passages 133 and contain the drivers 134 for driving the tacks, which operation takes place while the pincer mechanisms occupy the inward position shown in Fig. 6ª.

In combination with the pincer mechanism presser devices just described, means are, preferably, provided for limiting the yielding movement of the presser plates 127 on the pincer frames 25. Such limitation is important because it determines the position of the tacks as regards the distance thereof from the side of the work. That is to say, when the indraw and wiping-in operation takes place as previously described, the limitation of the relative yielding movement of the presser plate and pincer frame causes a corresponding restriction of the wiping-in movement of the pincer frame under the work, the wiper being arrested so that the tack holes 133 will occupy a definite position relatively to the presser 127 and consequently to the side of the work each time.

For gaging the limit of the movement of the presser 127 for the purpose specified there is provided a screw 135 threaded into the screw 131 which adjusts the pressure of spring 129. This screw 135 constitutes an adjustable stop, the aforesaid pin 130 or lug abutting against either the end of the screw or, preferably, against the end of a sleeve 136 thereon which serves as a carrier for the spring 129. By adjusting the screw 135 in the screw 131 the amount of yield allowed the presser 127 on the wiper 128— and consequently the driving position of the tack passages 133 relatively to the side of the boot or shoe—may be varied. The stop screw 135 may be fastened after adjustment by a locknut 137. Similarly the screw 131 may be locked with the pincer frame by a nut 138. The adjustment of screw 135 to vary the limited movement of the presser does not alter the pressure of the spring 129. By preference the pitch of the threads on both screws 131 and 135 is the same so that when the adjusting screw 131 is turned to alter the pressure of the spring 129, the position of the stop screw 135 will not be interfered with, providing of course that this is held from rotation during the rotation of screw 131. Instead of the arrangement described other suitable means may be employed for the same purpose.

In connection with the intermediate mechanism for actuating the pincer mechanisms from the actuating lever 107 yielding devices are provided, the provision in connection with the toe pincer mechanism having already been described herein. The object of the interposition of yielding devices between the actuating lever 107 and the side pincer mechanisms S is in order that undue strain on either side of the upper during the indraw and wiping-in motion shall be avoided. It is found in practice that sometimes, owing to the shape of the last or other causes, there may not be an equal provision on opposite sides of the work for turning in the upper, consequently as the side pincer mechanisms have normally an equal inward motion for indrawing the upper i. e. pulling it around the corner of the last, unless some provision is made for yielding there will be a liability for one side of the upper to be unduly strained and consequently torn or damaged.

A provision of yielding means such as before mentioned enables either pincer mechanism to give in relation to the actuating lever as and when required, and further, when the side pressers 127 of the pincer mechanisms S operate in conjunction with adjustable stops whereby their movement is limited in the manner previously described herein, the yielding means provided in connection with the side pincer mechanisms may operate in conjunction with the said limiting means. That is to say, the adjustable stops 135 arrest the yield of the pressers 127 on the wipers 128 as desired, whereupon the yielding means in connection with the side pincer mechanisms S operate to allow these to come to rest independently of the actuating lever. Similarly the yielding actuating connection between the lever 107 and the pincer mechanism T operates in conjunction with the presser 127 of said mechanism.

The said yielding devices of the side pincer mechanisms are inserted preferably between the bell-crank levers 114 and the adjustable member 120, 121, 122 coupling said levers to the vertical actuating lever 107. Each device (see Figs. 2 and 5) may consist of a spring pressed slide block 139 arranged in a slot 140 in the arm 141 of the bell-crank lever 114 and carrying the pin 142 which connects the adjacent end of the screw 120 to the said arm 141. This forms a yieldable connection between the coupling member and the bell-crank lever 114 actuated thereby, the block 139 sliding along the slot 140 against the pressure of the spring 143 when the inward movement of the pincer mechanism is arrested by the upper or by the stop screw 135 as described previously. A setting-up screw 144 may be furnished in the arm 141 of the lever to adjust the active pressure of the spring 143 and thus vary the pressure which can be applied by the pincer mechanism before the yield takes place.

Upon, or before, the completion of the wiping-in operation already described, and prior to the driving of the tacks, and preferably also prior to the release of the upper by the pincer devices, the before mentioned presser arm 2 is automatically lowered to cause a pad 145 to press upon the work in the region of the vamp to hold the boot or shoe firmly in position and prevent it being lifted by the blow of the drivers 134 when driving the tacks. The arm 2 is fulcrumed in the machine frame 1 at 146 (see Figs. 1, 4, and 13), the presser pad 145 being carried at the end of the arm by a holder 147 the shank 148 of which is adjustably fitted into the arm and is secured therein by a screw 149. Besides being adjustable vertically in the holder 147 by a screw 150, the pad is arranged to yield vertically to a limited extent against the action of a spring 151, and, as will be seen by reference to Fig. 3, the pad is also pivoted at 152 so that it can swing sidewise to a limited extent, springs 153 serving to normally centralize the pad. This capability of lateral yielding enables the pad to automatically adapt its position to "rights" and "lefts" and to position itself comfortably upon the vamp irrespective of varying cross sectional shapes of the work at this locality.

The rising and falling movements of the arm 2 are derived from a cam 154 (Figs. 1, 13 and 14) on the cam shaft 6, the cam serving to lower the arm, and springs 155 acting, when permitted by said cam, to raise the arm.

In order to firmly hold the work and enable it to withstand the force of the drive without movement, the holding pad 145 is caused to press upon the vamp with an unyielding pressure during the tacking operation, and to this end means are provided to lock the arm 2 in the lowered position. As the arm is to press unyieldingly upon the work, and as lasts vary in height in the locality of the vamp, it becomes necessary to use a locking mechanism which will be equally effective no matter what position the arm may have been moved to.

According to one form of such mechanism the pivoted arm 2 is actuated from the cam 154 through the medium of a spring to bring the presser pad 145 down upon the vamp, the arrangement being such that although, as is preferable, the said pad may be capable of yielding to a limited extent on the arm under the pressure of the spring 151 as already described, the arm is finally moved down to a sufficient extent to exceed such yield and press solidly upon the pad so that the latter presses unyieldingly upon the work. Thus, while the initial yielding pressure of the pad 145 may be sufficient and desirable to hold the work in position during the final stage or stages of the pulling-over operation, such pressure is ultimately superseded by the solid or unyielding pressure which positively prevents upward movement of the boot during the succeeding operation of tacking.

In a convenient arrangement, the cam 154 operates a slide frame 156, and pivotally attached to the arm 2 is a rod 157 telescopically slidable within a socket 158 pivotally attached to the slide frame 156. A compression spring 159, of greater power than the spring 151, which provides the yield of the presser pad 145 on the arm 2, acts between the end of this socket and an adjustable collar 160 on the rod 157. Slidable transversely through the socket 158 is a tapered bolt 161 operable by a lever 162 pivoted at 163 to lugs on the slide frame 156, one end of said lever being arranged to yieldingly push the tapered bolt 161 inward through the socket, the other end of the lever having a roll 164 to be engaged by a cam projection 165 on the cam 154 which actuates the slide frame. The yieldable actuation of the tapered bolt 161 by the lever 162 may be imparted through a spring 166.

The tapered bolt 161 when pushed into the socket 158 makes wedging contact with the end of the before mentioned rod 157, that is to say, it wedges between the end of the said rod and the side of a slot 167 in which the bolt is situated. The bolt functions as a cotter or wedge between the rod and the socket and thus completes a solid and unyielding medium between the arm and the slide frame.

In operation, after the arm 2 has been moved to the operative position, by its cam 154 acting through the spring 159, to firmly press the pad upon the vamp of the work, and the rod 157 has assumed its final relative position in the socket 158, then before the tacks are driven, and while a concentric portion 168 of the cam 154 allows the slide frame 156 to remain quiescent, the cam projection 165 actuates the lever 162 and thereby causes the tapered bolt 161 to be pressed inward under the end of the rod this inward movement continuing until the bolt has entered a sufficient distance to accommodate its position to that of the rod, whereupon further movement thereof being prevented by the wedging of the bolt between the rod and socket the spring 166 yields to the remaining movement of the lever 162, and being thus compressed, pushes the bolt firmly into locking position and holds it there while the tack driving operation takes place. Prior to the slide frame being further actuated by its cam 154 and after the tacking operation has been completed, the cam projection 165 allows the lever 162 to be moved in the reverse direction by a spring 169 to withdraw the locking bolt 161. The bolt has a shank 170 which passes through the lever 162 and has a nut 171 on the end whereby the lever will—when moved by the spring 169—positively withdraw the bolt. The end of the rod 157 may be shaped to fit the incline of the bolt as shown in Fig. 13.

The previously mentioned cam 90 for controlling the locking pawls 87 of the pincer devices, is preferably timed so that said pincer devices, although holding the upper and maintaining it stretched over the last, are not locked by these pawls against upward movement in the pincer frames until immediately prior to the opening of the grippers, said pincer devices up to this time being held down solely by the treadle 36. By this arrangement the pincer devices are enabled to yield upwardly by further compressing the springs 42, if necessary, at any time during the wiping-in action, thereby avoiding undue strain upon the upper as might otherwise be caused by the movement of the pincer mechanisms when wiping-in the upper over the inner sole and around the corner of the last.

After the wiping-in operation has taken place and the presser arm 2 has descended to hold the work, as already described, the treadle 36 is automatically released by the cam 72 and brings about the opening of the pincer jaws 22, 23 to relax their bite on the upper. This opening of the pincer jaws is effected by the springs 38 raising the treadle which, by the connecting link 37 raises the slide 35 this pushing upward the rods 39 which, by the intermediate attached couplings 40, impart an upward movement to the inner rods 28 in the pincer cases 24, the latter being held down by the locking pawls 87. The upward movement of the inner rods 28 will—by raising the rollers 29—allow the jaws 22, 23 to be opened by the springs 34.

The boot or shoe now being held from movement by the presser pad 145, and the stretched and pulled-over upper being held against the last by the side pressers 127 and wipers 128, the tacks are driven to secure the upper to the last. The tacks are fed, head downward, from a suitable delivery mechanism down tubes 172 and into the holes 133 in the wipers before the side pressers 127 move back on the pincer frames. The drivers 138 are mounted upon bars 173 (Figs. 3 and 4) slidable in the pincer frames 25 and connected by rods 174 to a bracket 175 slidable up and down the front of the machine frame 1. The bracket 175 is normally held down against the action of a spring actuated arm 176 by a concentric portion of the outer periphery of the cam 90 previously referred to against which a roller 177 on the bracket bears. This periphery is cut away at a certain part to form a shoulder which, when it passes over the roller 177 allows the arm 176 to move the bracket 175 upward to force up the drivers 134 to drive the tacks. The bracket 175 is afterward moved down by a cammed portion of the before mentioned periphery.

After the tacking operation, the presser arm 2 rises, the pincer mechanisms S and T are moved outward and the cam 90 moves the slide bracket 89 down thereby withdrawing the pawls 87 from engagement with the pincer racks 86 whereupon the pincer cases 24 being released, together with the pincer jaws are raised to the normal position by the springs 26, the jaws being open in readiness to receive the upper of the next boot or shoe to be operated upon.

The complete operation of the improved machine will now be described. Normally the machine is at rest, the clutch 5 being constantly driven by belt, the presser arm 2 occupies a raised position, the pincer mechanisms S, T are in the outward position and the pincer devices are in their highest position the jaws 22, 23 being open. After the initial adjustments of the sole rest 12, heel support 46, pincer mechanisms S and T, stop screws 135, and presser pad 145 have been made, if necessary, to suit the work to be dealt with, the operator places the boot (innersole facing downward) approximately in position, the innersole resting upon the supports 13, 14 of the rest 12, the back in the angular support 46, and the edge of the upper $u$ at the toe being inserted between the jaws 22, 23 of the toe pincer mechanism T. Having correctly located the toe of the boot, the knee lever 57 is moved to cause the toe pincer jaws to close and grip the upper. Now while the toe portion of the upper is held from movement by the closed pincer jaws the operator can insert the side edges of the upper between the pincer jaws of the respective side pincer mechanisms S if this has not already been done, and he can also properly locate the last upon the supporting means, the holding of the work at the toe facilitating this positioning operation. The boot having been positioned as described, the stretching treadle 36 is depressed whereupon the side pincer jaws are closed and grip the upper after which the three pincer mechanisms move down together, stretching the upper over the last to such a degree as may be determined by the operator, the treadle being locked in the manner already described.

With regard to the insertion of the work into the machine, it is sometimes unnecessary to primarily grip the upper at the toe, but instead the edge of the upper is inserted initially in all three pincer devices and when the treadle is depressed after positioning the work, the jaws of the side and toe pincer devices are closed simultaneously.

While gradually depressing the treadle to stretch the upper, the operator may, by manipulating the hand lever 63 or 60, or both, humor the upper if necessary to facilitate the stretching of the same over the last. Also, prior to or upon the depression of the treadle to the extent necessary, the operator may move either or both of the side pincer mechanisms S by means of the hand levers 96 to shift the upper in relation to the toe. He may also, at this stage, shift or adjust the upper over the last from side to side by manually operating the balancing bar 43 when provision is made to the manner previously indicated, for doing so.

Having initially stretched the upper over and correctly located same on the last, the treadle 36 and hand levers 96 now remain locked to hold the work in position, and upon the treadle 9 being actuated, the pincer devices T, S are moved inward and the presser arm 2 also comes down to position and press the holding pad 145 upon the vamp to hold the work while the wipers 128 turn the upper u under the insole. The pincer cases 24 are then locked, the grippers release the edge of the upper and the tacks are driven after which the parts return to their normal position as already described.

The invention is not to be confined to the specific details of construction herein described, as these may be varied without departing from the scope of the invention.

What we claim then is:—

1. A pulling-over machine comprising, in combination, means to support a last bottom downward in an approximately horizontal position and hold it stationary during the whole operation of the machine, upper gripping pincer mechanisms for drawing the upper around the last, said mechanism being operable entirely by the operator for stretching the upper over the last, power driven mechanism subsequently put into operation at will to wipe in the stretched upper under the last, means to alter the set of the upper upon the last during the stretching operation and means to automatically adjust and equalize the pull of the pincers according to differences between the parts of the upper being drafted.

2. A pulling-over machine comprising, in combination, means to support a last bottom downward in an approximately horizontal position and hold it stationary during the whole operation of the machine, upper gripping pincer mechanisms operable entirely by the operator for stretching the upper over the last, and power driven mechanism subsequently put into operation at will to wipe in the stretched upper under the last, means to automatically insert fasteners therein, and means to secure the wiped in portions of the upper to the last through the medium of said fasteners.

3. A pulling-over machine comprising, in combination, means to support a last bottom downward in an approximately horizontal position and hold it stationary during the whole operation of the machine, upper gripping pincer mechanisms operable entirely by the operator for stretching the upper over the last, means to adjust the upper upon the last during the stretching operation while the strain is being exerted on the upper, and power driven mechanism subsequently put into operation at will to wipe in the stretched upper under the last.

4. A pulling-over machine comprising, in combination, means to support a last bottom downward in an approximately horizontal position and hold it stationary during the whole operation of the machine, upper gripping pincer mechanisms operable entirely by the operator for stretching the upper over the last, means to adjust the upper upon the last during the stretching operation and without relaxing the strain upon the upper, power driven mechanisms subsequently put into operation at will to wipe in the stretched upper under the last, and means to insert automatically fasteners to finally secure the pulled-over upper to the last.

5. In a pulling-over machine, in combination, stationary last supporting means, toe and side pincer mechanisms adapted for gripping and stretching the upper over the last, manually operable means for moving the side pincer mechanisms relatively to the toe pincer mechanisms while the upper is being stretched or maintained stretched, devices to lock said manual means after operation, and mechanism to subsequently automatically return said side pincer mechanisms to their normal position relatively to the toe pincer mechanism.

6. A pulling-over machine comprising, in combination, stationary last supporting means, pincer mechanisms adapted for gripping the upper, means operable by the operator to actuate said mechanisms for stretching the upper over the last, power driven mechanism subsequently put into operation at will to actuate said pincer mechanisms for wiping-in the stretched upper, and gripping devices in said pincer mechanisms adapted—while maintaining their grip upon the upper—to freely tilt or yield bodily in said mechanisms during the wiping-in movement of the latter for the purpose described.

7. In a pulling-over machine, in combination, upper gripping pincer mechanisms, fastener inserting means and yielding presser devices thereon, the presser devices being capable of an adjustable limited movement in relation to said fastener inserting means and adapted to hold the upper at the corner of the last and define the position of the fastener inserting means under the insole relatively to the corner of the last.

8. In a pulling-over machine, in combination, upper gripping pincer mechanisms, wipers and fastener inserting means and also yielding presser devices thereon the latter being capable of a limited movement in relation to said fastener inserting means, said pincer mechanisms having a movement relatively toward each other to wipe the upper under the insole, hold the upper against the corner of the last, and define the position of the fastener inserting means under the insole.

9. A pulling-over machine comprising, in combination, stationary last supporting means; pincer mechanisms adapted for gripping and pulling the upper over the last; wipers, fastener inserting means, and presser devices having a limited yielding movement in relation to said fastener inserting means and forming part of said pincer mechanisms; means operable by the operator for actuating the pincer mechanisms to stretch the upper over the last; power driven mechanism to actuate the pincer mechanisms to wipe-in the stretched upper, and devices interposed between said mechanism and the pincer mechanisms to allow the latter—when necessary—to yield relatively to the actuating mechanism for the purpose described.

10. In a pulling-over machine, in combination, stationary last supporting means, pincer mechanisms adapted for gripping and stretching the upper over the last, means operable by the operator to actuate said pincer mechanisms to stretch the upper, mechanism to automatically lock said actuating means when in use, and means to subsequently automatically release said actuating means.

11. In a pulling-over machine, in combination, stationary last supporting means, pincer mechanisms adapted for gripping and stretching the upper over the last, means operable by the operator to actuate said pincer mechanisms to stretch the upper, mechanism to automatically lock said actuating means, and means whereby said locking mechanism may be rendered operative at will.

12. In a pulling-over machine, in combination, stationary last supporting means, pincer mechanisms adapted for gripping and stretching the upper over the last, means operable by the operator to actuate said pincer mechanisms to stretch the upper, mechanism to automatically lock said actuating means, means to subsequently automatically release said actuating means, means whereby said locking mechanism may be rendered operative for locking at will, and means whereby the actuating means may be unlocked at will, for the purpose described.

13. In a pulling-over machine, in combination, stationary last supporting means, pincer mechanisms, pincer devices movable in said mechanisms comprising cases and upper gripping jaws, actuating means to move said pincer devices in the mechanisms to strain the upper over the last, mechanism to lock said actuating means, and means to automatically lock and unlock the cases of the pincer devices independently of the aforesaid locking mechanism, for the purpose described.

14. In a pulling-over machine, in combination, stationary last supporting means, pincer mechanisms, pincer devices in said mechanisms comprising cases and upper gripping jaws, actuating means to move said pincer devices in the mechanisms to strain the upper over the last, mechanism to automatically lock said actuating means, means to automatically lock the cases of the pincer devices independently of the aforesaid locking mechanism, means to automatically release the actuating means while the pincer cases remain locked whereby the gripping jaws release the upper, and means to subsequently automatically unlock the pincer cases to enable the pincer devices to return to the normal position.

15. A pulling-over machine comprising, in combination stationary last supporting means, pincer mechanisms, pincer devices movable in said mechanisms consisting of cases and upper gripping jaws, wipers, fastener inserting means, and pressers on said mechanisms, means operable by the operator to actuate the pincer devices in said mechanisms to grip and stretch the upper over the last, means arranged to be put into operation at will to automatically lock said actuating means, power driven mechanism arranged to be put into operation at will to move the pincer mechanisms inward to wipe in and subsequently hold the stretched upper against the last; means to automatically lock the pincer cases, means to automatically release the aforesaid actuating means whereby the upper is released by the gripping jaws, means to automatically operate the fastener inserting means to secure the pulled-over upper to the last, and means to automatically unlock the pincer cases for the purpose described.

16. In a pulling-over machine, in combination, stationary last supporting means, pincer mechanisms adapted for gripping and pulling the upper over the last, and a heel supporting device comprising a rest plate to partly embrace the back of the last to hold it against lateral and rearward movement, and an arcuate slide way along which said rest plate is adjustable, said slideway and rest plate being adjustable toward and from the pincer mechanisms, for the purpose described.

17. In a pulling-over machine, in combination, stationary last supporting means, pincer mechanisms adapted for gripping and pulling the upper over the last, and a heel supporting device comprising a rest plate to partly embrace the back of the last to hold it against lateral and rearward movement, an arcuate slideway along which said rest plate is adjustable, said slideway and rest plate being adjustable toward and from the pincer mechanisms, and means for locking the rest plate and slide in their adjusted positions, for the purpose described.

18. In a pulling-over machine, in combination, stationary last supporting means, pincer mechanisms adapted for gripping and pulling the upper over the last, and a heel supporting device comprising a hollowed or angular rest plate to partly embrace the back of the last, a block, an arcuate slideway therein along which the rest plate is adjustably movable, locking means combined with the latter to normally fix it in the slideway, said means being releasable to adjust the rest plate, a bracket along which the aforesaid block is adjustably slidable in a direction transverse to the direction of movement of the rest plate in the slideway, a toothed rack on said bracket, and a pawl on said block to engage the rack and hold the block against backward movement.

19. In a pulling-over machine, in combination, work holding means comprising a movable arm, a pad thereon adapted for pressing upon the work, a cam, intermediate means between said cam and the arm to actuate the latter, and a spring combined with said intermediate means adapted to be compressed to hold the pad upon the work, for the purpose described.

20. In a pulling-over machine, in combination, work holding means comprising a movable arm, a pad thereon adapted for pressing upon the work, a cam, intermediate means between said cam and the arm to actuate the latter, a spring combined with said intermediate means adapted to be compressed to hold the pad upon the work, members combined with said intermediate means which when the spring is compressed have a relative approach, and a device automatically movable to an operative position between said members to prevent their further approach and thus lock the arm in the operative position.

21. In a pulling-over machine, in combination, work holding means comprising a movable arm, a pad thereon adapted for pressing upon the work, a cam, intermediate means between said cam and the arm to actuate the latter, a spring combined with said intermediate means adapted to be compressed to hold the pad upon the work, members combined with said intermediate means which when the spring is compressed have a relative approach, a device movable to an operative position between said members to prevent their further approach, and means for actuating said device in a yielding manner to allow it to adjust itself to the space between the members determined by the position of the pad upon the work, for the purpose described.

22. In a pulling-over machine, in combination, work holding means comprising a movable arm, a pad thereon adapted for pressing upon the work, a cam, intermediate means between said cam and the arm to actuate the latter, a spring combined with said intermediate means adapted to be compressed to hold the pad upon the work, members combined with said intermediate means which when the spring is compressed have a relative approach, a slidable tapered bolt movable to an operative position between the opposing ends of said members to act as a wedge to prevent their further approach, a lever to move said bolt, a cam to actuate the lever, and a spring interposed between said lever and the bolt whereby the latter is yieldingly pressed to the operative position by the lever for the purpose described.

23. In a pulling-over machine, in combination, work holding means comprising a movable arm, a pad thereon adapted for pressing upon the work, a cam and intermediate means through which said cam operates the arm, a spring combined with said intermediate means adapted to be compressed by the action of the cam on the arm, members combined with said intermediate means having a relative approach when the spring is compressed, a slidable tapered bolt movable to an operative position between the opposing ends of said members to act as a wedge to prevent their further approach, a lever to move said bolt, a cam to actuate the lever, a spring interposed between said lever and the bolt whereby the latter is yieldingly pressed to the operative position by the lever, and a spring to move the lever to withdraw the bolt, the lever actuating cam being arranged to act in timed relation to the aforesaid arm actuating cam so that it inserts the locking bolt after the actuation of the cam to lower the arm and releases the lever to withdraw the bolt before the action of the cam to raise the arm takes place.

24. In a pulling-over machine, in combination, stationary last supporting means, pincer devices adapted for gripping the upper at the sides of the toe and stretching it over the last, means for drawing down said pincer devices, springs combined with said means and through which the pincer devices are actuated, and a centrally pivoted rocker bar, the ends of the springs of the opposite pincer devices bearing against the said bar on respectively opposite sides of the fulcrum thereof, said bar being adapted to turn on its fulcrum to automatically balance or equalize the pressure on the opposite springs for the purpose described.

25. In a pulling-over machine, in combination, stationary last supporting means, pincer devices adapted for gripping the upper at the sides of the toe and stretching it over the last, means operable entirely by the operator for drawing down said pincer devices, springs combined with said means and through which the pincer devices are actuated, and a centrally pivoted rocker bar, the ends of the springs of the opposite pincer devices bearing against the said bar on respectively opposite sides of the fulcrum thereof, said bar being adapted to turn on its fulcrum to automatically balance or equalize the pressure on the opposite springs, for the purpose described.

26. In a pulling-over machine, in combination, stationary last supporting means, pincer devices adapted for gripping the upper at the sides of the toe and stretching it over the last, a treadle adapted for depression by the operator, a slide, a link connecting said slide with the treadle, a rocker bar centrally pivoted on the slide, actuating connecting means between the pincer devices and the slide, and springs interposed between said connecting means and the rocker bar, the movement being transmitted from the slide to the connecting means through the medium of the rocker bar and springs, for the purpose described.

27. In a pulling-over machine, in combination, stationary last supporting means, pincer devices adapted for gripping the upper at the sides of the toe and stretching it over the last, means for drawing down said pincer devices, springs combined with said means and through which the pincer devices are actuated, a centrally pivoted rocker bar, the ends of the springs of the opposite pincer devices bearing against the said bar on opposite sides of the fulcrum thereof, and a handle on the rocker bar by which it may be manually actuated on its fulcrum to effect opposite relative movement of the pincer devices along the line of their operation, for the purpose described.

28. In a pulling-over machine, in combination, stationary last supporting means, pincer devices adapted for gripping and stretching the upper over the last, a treadle adapted for depression by the operator, a slide, a link connecting said slide with the treadle, actuating connecting means between said slide and the pincer devices, springs interposed between said connecting means and the slide, and a hand lever adapted to move the connecting means in opposition to the downward pull imparted thereto through the springs by the slide, for the purpose described.

29. In a pulling-over machine, in combination, stationary last supporting means, pincer devices adapted for gripping and stretching the upper over the last, a treadle adapted for depression by the operator, a vertically movable slide, a link connecting said slide with the treadle, rods vertically movable in the slide, springs combined with said rods to yieldingly hold them down, couplings forming actuating connections between said rods and the respective pincer devices, and a manually operable lever adapted to raise the rods in the slide against the action of the springs, for the purpose described.

30. In a pulling-over machine, in combination, stationary last supporting means, toe and side pincer devices adapted for gripping and stretching the upper over the last, a treadle adapted for depression by the operator, a vertically movable slide, a link connecting said slide with the treadle rods vertically movable in the slide, springs combined with said rods to yieldingly hold them down, couplings forming actuating connections between said rods and the respective pincer devices, a hand lever pivoted upon the slide and adapted to raise the rod of the toe pincer device against the action of the spring, and a hand lever pivoted upon the link and adapted to raise the rods of the side pincer devices against the action of the springs, for the purpose described.

31. In a pulling-over machine, in combination, stationary last supporting means, toe and side pincer mechanisms adapted for gripping and pulling the upper over and around the last, slidable trunnions upon which the side pincer mechanisms are mounted, and hand levers for imparting endwise movement to said trunnions to adjust the side pincer mechanisms relatively to the toe pincer mechanism during the stretching operation, for the purpose described.

32. In a pulling-over machine, in combination stationary last supporting means, toe and side pincer mechanisms adapted for gripping and pulling the upper over and around the last, slidable trunnions upon which the side pincer mechanisms are mounted, hand levers for imparting endwise movement to said trunnions to adjust the side pincer mechanisms relatively to the toe pincer mechanism during the stretching operation, spring actuated locking devices on the hand levers, fixed segments with which said locking devices engage to hold the hand levers against movement, and grip levers combined with the hand levers to release the locking devices to free the hand levers.

33. In a pulling-over machine, in combination, stationary last supporting means, toe and side pincer mechanisms adapted for gripping and pulling the upper over and around the last, slidable trunnions upon which the side pincer mechanisms are mounted, hand wheels combined with the trunnions for moving them endwise to initially adjust the side pincer mechanisms relatively to the toe pincer mechanism, hand levers to impart movement to the hand wheels and trunnions to adjust the side pincer mechanisms relatively to the toe pincer mechanisms during the stretching operation, locking devices combined with the hand levers to fasten the same after adjustment, and automatically operating means to subsequently return the side pincer mechanisms to their initial positions upon the completion of the pulling-over operation.

34. In a pulling-over machine, in combination, stationary last supporting means, toe and side pincer mechanisms adapted for gripping and pulling the upper over and around the last, slidable trunnions upon which the side pincer mechanisms are mounted, hand wheels combined with the trunnions and rotatable to move them endwise to initially set the side pincer mechanisms, hand levers to impart movement to the hand wheels and trunnions to adjust the side pincer mechanisms relatively to the toe pincer mechanism during the stretching operation, locking devices combined with the hand levers to fasten the same after adjustment, plungers adapted to hold the hand wheels in a normal position but capable of yielding during the stretching operation to permit the aforesaid manual actuation of said hand wheels to take place, and automatic means operable upon the completion of the pulling-over operation to release the locking devices of the hand levers and positively actuate the plungers to return the hand wheels to the normal position.

35. In a pulling-over machine, pincer mechanisms adapted for gripping and pulling the upper around the last, pincer devices in said mechanisms, a pair of gripping jaws in each of said devices, and a pin in each device upon which said jaws are mounted, said jaws being capable of a relative movement upon the pin as in opening and closing, and also of a turning movement thereon in company with each other when closed, for the purpose described.

36. In a pulling-over machine, pincer mechanisms adapted for gripping and pulling the upper around the last, pincer devices in said mechanisms, each comprising a pincer case, a fulcrum pin therein, a pair of gripping jaws mounted upon said pin and capable of relative movement and a turning movement in company thereon, converging extensions on said jaws, a rod slidable in the pincer case, a pair of links pivotally attached to one end of the rod, and a roller carried between the free ends of the links and situated between the converging extensions of the gripping jaws, the roller acting upon the extensions to close the gripping jaws or allow them to open upon a relative movement of the rod and pincer case taking place.

37. In a pulling over machine, pincer mechanisms adapted for gripping and pulling the upper around the last, each comprising a pincer frame and a pincer device movably mounted therein, fastener inserting means in the said frame, a presser plate slidable on the frame in relation to the fastener inserting means, a spring to yieldingly resist the movement of said plate, and a stop screw to limit the movement of said plate, for the purpose described.

38. In a pulling-over machine, pincer mechanisms adapted for gripping and pulling the upper around the last, each comprising a pincer frame and a pincer device movably mounted therein, a wiper device on the pincer frame, fastener inserting means in the said frame, a presser plate slidable on the frame in relation to the fastener inserting means, a spring to yieldingly resist the movement of said plate, an adjusting screw in the pincer frame to vary the pressure of said spring, and a stop screw adjustable in the said adjusting screw adapted to variably limit the movement of the presser plate, for the purpose described.

39. In a pulling-over machine, in combination, toe and side pincer mechanisms adapted for gripping and pulling the upper around the last, said mechanisms being pivotally mounted and capable of relative movement toward and from each other, power driven means for actuating said mechanisms comprising a lever, a cam to actuate the same, a coupling member between said lever and the toe pincer mechanism, bell-crank levers connected to the side pincer mechanisms, and coupling members between said bell-crank levers and the aforesaid lever.

40. In a pulling-over machine, in combination, toe and side pincer mechanisms adapted for gripping and pulling the upper around the last, said mechanisms being pivotally mounted and capable of relative movement toward and from each other, power driven means for actuating said mechanisms comprising a lever, a cam to actuate the same, a coupling member between said lever and the toe pincer mechanism, bell-crank levers connected to the side pincer mechanisms, coupling members between said bell-crank levers and the aforesaid lever, and springs arranged to allow the pincer mechanisms to yield in relation to the actuation lever, for the purpose described.

41. In a pulling-over machine, in combination, toe and side pincer mechanisms adapted for gripping and pulling the upper around the last, said mechanism being pivotally mounted and capable of relative movement toward and from each other, power driven means for actuating said mechanisms comprising a lever, a cam to actuate the same, a coupling member between said lever and the toe pincer mechanisms, bell-crank levers connected to the side pincer mechanisms, coupling members between said bell-crank levers and the aforesaid lever, springs arranged to allow the pincer mechanisms to yield in relation to the actuating lever, and means for adjusting the effective relation between the pincer mechanisms and the actuating lever.

42. In a pulling-over machine, side pincer mechanism adapted for gripping and pulling the upper around the last, supporting collars in which said mechanisms are rotatably adjustable, means to secure said mechanisms in position in the collars, and trunnions on said collars mounted to form an axis upon which the pincer mechanisms can move relatively toward and from each other, for the purpose described.

43. In a pulling-over machine, in combination, pincer mechanisms adapted for gripping and pulling the upper over the last and comprising pincer frames and pincer devices movable and spring controlled in said frames, toothed racks on the pincer devices, pawls on the pincer frames adapted to engage said racks to hold the pincer devices against return movement in the pincer frames, and automatic means to bring the pawls into and out of engagement with the racks to lock and unlock the pincer devices, for the purpose described.

44. In a pulling-over machine, in combination, pincer mechanisms adapted for gripping and pulling the upper over the last and comprising pincer frames and pincer devices movable and spring controlled in said frames, toothed racks on the pincer devices, spring actuated pawls on the pincer frames, a slidable bracket, connecting means between the pawls and the bracket, springs to move said bracket in one direction to permit the engagement of the pawls with the racks to hold the pincer devices against return movement in the pincer frames, and a cam to move said bracket in an opposite direction to disengage the pawls from the racks to release the pincer devices, for the purpose described.

45. In a pulling-over machine, in combination, stationary last supporting means, pincer devices adapted for gripping the upper, a treadle adapted for depression by the operator to actuate said pincer devices for stretching the upper over the last, springs to raise said treadle, a slidable rack connected to the treadle, a spring pressed pawl to engage said rack, a slide bar carrying said pawl, a slide, a projection thereon adapted to disengage the pawl from the rack, a cam to actuate the slide bar to move the pawl into contact with the projection, and hand operable means to actuate the slide to move the projection into contact with the pawl, for the purpose described.

46. In a pulling-over machine, in combination, stationary last supporting means, pincer devices adapted for gripping the upper, a treadle adapted for depression by the operator to actuate said pincer devices for stretching the upper over the last, springs to raise said treadle, a slidable rack connected to the treadle, a spring pressed pawl to engage said rack, a slide bar carrying said pawl, a slide, a projection thereon adapted to disengage the pawl from the rack, a cam to actuate the slide bar to move the pawl into contact with the projection, hand operable means to actuate the slide to move the projection into contact with the pawl, a pivoted plate adapted to hold the pawl clear of the rack, a hand operable plunger knob, a spring to control the same, and intermediate connection between said knob and the pivoted plate to move the latter to release the pawl when the knob is actuated for the purpose described.

47. In a pulling-over machine, in combination, stationary last supporting means, upper gripping pincer devices, a treadle adapted for depression by the operator to actuate said pincer devices for stretching the upper over the last, springs to raise said treadle, a slidable rack connected to the treadle, a spring pressed pawl to engage said rack, a cam to automatically disengage the pawl from the rack, manual means to disengage the pawl from the rack, a pivoted plate adapted to hold the pawl clear of the rack, a hand operable plunger knob, intermediate connections between said knob and the pivoted plate to move the latter to release the pawl when the knob is actuated, and automatic means to subsequently restore said knob and pivoted plate to their normal positions, for the purpose described.

48. In a pulling-over machine, in combination, stationary last supporting means, pincer devices adapted for gripping and stretching the upper over the last, a treadle for depression by the operator, connected actuating means between said treadle and the pincer devices, springs to raise the treadle, a slidable rack connected to the treadle, a spring pressed pawl to engage said rack, a cam to automatically disengage the pawl from the rack, manual means to disengage the pawl from the rack, a pivoted plate adapted to hold the pawl clear of the rack, a hand operable plunger knob, a bell-crank lever, a rod connecting the said bell-crank lever and the pivoted plate, a rod connecting the bell-crank lever and the knob, the said plate being moved to release the pawl on the depression of the knob, an adjustable collar on the rod connecting the knob and bell-crank lever, and a bracket on the aforesaid connected actuating means of the treadle and pincer mechanisms adapted to engage the said collar and automatically restore the knob and pivoted plate to their normal positions when the treadle rises, for the purpose described.

In testimony whereof we have signed our names to this specification in the presence of two subscribing witnesses.

WILLIAM PHILIP MILLS.
CHARLES MARTIN BAGSHAW.

Witnesses:
R. W. C. TAYLOR,
GEORGE LESTER.

Copies of this patent may be obtained for five cents each, by addressing the "Commissioner of Patents, Washington, D. C."